US008992892B2

(12) United States Patent
Backes et al.

(10) Patent No.: US 8,992,892 B2
(45) Date of Patent: Mar. 31, 2015

(54) USE OF 1-(2,4-DIHYDROXY-PHENYL)-3-(3-HYDROXY-4-METHOXY-PHENYL)-PROPAN-1-ONE

(75) Inventors: Michael Backes, Holzminden (DE);
Tobias Vössing, Beverungen (DE);
Jakob Peter Ley, Holzminden (DE);
Susanne Paetz, Höxter (DE)

(73) Assignee: SYMRISE AG, Holzminden (DE)

( * ) Notice: Subject to any disclaimer, the term of this patent is extended or adjusted under 35 U.S.C. 154(b) by 288 days.

(21) Appl. No.: 13/018,906

(22) Filed: Feb. 1, 2011

(65) Prior Publication Data
US 2011/0189108 A1   Aug. 4, 2011

(30) Foreign Application Priority Data
Feb. 1, 2010   (EP) .................................... 10152331

(51) Int. Cl.
*A61K 8/00* (2006.01)
*A23L 1/236* (2006.01)
*A23L 1/22* (2006.01)

(52) U.S. Cl.
CPC ............. *A23L 1/236* (2013.01); *A23L 1/22083* (2013.01)
USPC .......................................................... 424/49

(58) Field of Classification Search
CPC combination set(s) only.
See application file for complete search history.

(56) References Cited

U.S. PATENT DOCUMENTS

| 3,924,017 A | 12/1975 | Lee et al. |
| 5,643,941 A | 7/1997 | Kurtz et al. |
| 7,025,999 B2 | 4/2006 | Johnson et al. |
| 2004/0142084 A1 | 7/2004 | Knueven |
| 2008/0227867 A1 | 9/2008 | Ley et al. |
| 2008/0305052 A1* | 12/2008 | Ley et al. .......................... 424/49 |

FOREIGN PATENT DOCUMENTS

| EP | 1258200 A2 | 11/2002 |
| EP | 1291342 A1 | 3/2003 |
| EP | 1955601 A1 | 8/2008 |
| EP | 1989944 A1 | 11/2008 |
| EP | 1 998 636 A1 | 12/2008 |
| EP | 2008530 A1 | 12/2008 |
| WO | WO-93/10677 A1 | 6/1993 |
| WO | WO-9820753 A1 | 5/1998 |
| WO | WO-2004050069 A1 | 6/2004 |
| WO | WO-2004078302 A1 | 9/2004 |
| WO | WO-2005/041684 A2 | 5/2005 |
| WO | WO-2005096841 A1 | 10/2005 |
| WO | WO-2006024587 A1 | 3/2006 |
| WO | WO-2006058893 A2 | 6/2006 |
| WO | WO-2006087991 A1 | 8/2006 |
| WO | WO-2006106023 A1 | 10/2006 |
| WO | WO-2007003527 A1 | 1/2007 |
| WO | WO-2007014879 A1 | 2/2007 |
| WO | WO-2007107596 A1 | 9/2007 |
| WO | WO-2008046895 A1 | 4/2008 |

OTHER PUBLICATIONS

DuBois et al, "Nonnutritive Sweeteners: Taste-Structure Relationships for Some New Simple Dihydrochalcones," Science, vol. 195, No. 4276, pp. 397-399 (1977).*
"Position of the American Dietetic Association: Use of Nutritive and Nonnutritive Sweeteners," Journal of the American Dietetic Association 2004, vol. 104, No. 2, 255-275.
Ley J.P., Masking Bitter Taste by Molecules, Chemosensory Perception, (2008) 1:58-77.
Antus, S., "Dihydrochalcone Type Sweetening Agents, I", Acta Chimica Acad. Sci. Hung., 98 (2), pp. 225-230 (1978).
Yamato, M., "Chemical structure and sweet taste of isocoumarins and related compounds," Chemical Senses and Flavour, vol. 1, No. 9 (1979), 35-47.
DuBois, G.E., "Dihydrochalcone Sweetners. A Study of the Atypical Temporal Phenomena," J. Med. Chem. 1981, 24(4), 408-428.
Yamada A., et al., Chronic Toxicity Study of Dietary Stevia Extracts in F344 Rats, J. Food Hyg. Soc., Japan, vol. 26, No. 2, 169-183, 1985.
Melis, M.S., "Effects of chronic administration of *Stevia rebaudiana* on fertility in rats," Journal of Ethnopharmacology, 167, (1999) 157-161.
Chiba, T., "Total Syntheses of Spidamine and Joramine, Polyamine Toxins from the Joro Spider, *Nephlia clavata*," Chemical & Pharmaceutical Bulletin 1996, 44(5), 972-979 (1996).
Pearson A.J., et al., "Studies on Ristocetin A. A Synthesis of Protected Ristomycinc Acid Using Organomanganese Chemistry,"*Tetrahedron*, vol. 48, No. 36, pp. 7527-7538, 1992.
Dick, William E., Jr., "Structure-Taste Correlations for Flavans and Flavanones Conformationally Equivalent to Phyllodulcin," J. Agric. Food Chem., 1981, 29, pp. 305-312.

* cited by examiner

*Primary Examiner* — Dennis J Parad
(74) *Attorney, Agent, or Firm* — Novak Druce Connolly Bove + Quigg LLP

(57) ABSTRACT

The invention concerns the use of a
deoxy hesperetin dihydrochalcone
or
a salt of the deoxy hesperetin dihydrochalcone (I) or a mixture comprising or
consisting of a plurality of salts of the deoxy hesperetin dihydrochalcone (I)
or
a mixture comprising or consisting of
deoxy hesperetin dihydrochalcone (I) and
a salt or a plurality of salts of the deoxy hesperetin dihydrochalcone (I), to influence the strength of taste impressions of sweet-tasting, unpleasant-, in particular bitter-, tasting or both sweet- and unpleasant-, in particular bitter-, tasting substances or mixtures of substances.

17 Claims, No Drawings

USE OF 1-(2,4-DIHYDROXY-PHENYL)-3-(3-HYDROXY-4-METHOXY-PHENYL)-PROPAN-1-ONE

CROSS-REFERENCE TO RELATED APPLICATIONS

This application claims priority under 35 U.S.C. §119(a) to Application No. 10 152 331.4, filed in Europe on Feb. 1, 2010, the entire contents of which is hereby incorporated by reference.

The present invention concerns the use of 1-(2,4-dihydroxy-phenyl)-3-(3-hydroxy-4-methoxy-phenyl)-propan-1-one (Formula (I)), in the following referred to as deoxy hesperetin dihydrochalcone (I), wherein (I) is understood to be a reference to Formula (I),

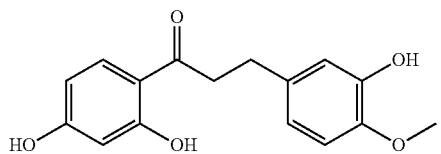

(I)

or a salt of the deoxy hesperetin dihydrochalcone (I) or a mixture comprising or consisting of a plurality of salts of the deoxy hesperetin dihydrochalcone (I) or a mixture comprising or consisting of deoxy hesperetin dihydrochalcone (I) and a salt of the deoxy hesperetin dihydrochalcone (I) or a plurality of salts of the deoxy hesperetin dihydrochalcone (I), in order to influence the strength of taste impressions of sweet-tasting, unpleasant-, in particular bitter-, tasting or both sweet- and also unpleasant-, in particular bitter-, tasting substances or mixtures of substances.

The present invention also concerns aroma compositions comprising deoxy hesperetin dihydrochalcone (I) or a salt of the deoxy hesperetin dihydrochalcone (I) or a mixture comprising or consisting of a plurality of salts of the deoxy hesperetin dihydrochalcone (I) or a mixture comprising or consisting of deoxy hesperetin dihydrochalcone (I) and a salt or a plurality of salts of the deoxy hesperetin dihydrochalcone (I).

The present invention also concerns preparations, in particular preparations serving for nutrition, as food supplements, for oral care or for pleasure, as cosmetics or pharmaceuticals for oral administration comprising such an aroma composition.

In addition, the present invention concerns a method for manufacturing such aroma compositions or such preparations.

Furthermore, the invention concerns a method for influencing the strength of taste impressions of taste impressions of sweet-tasting, unpleasant-, in particular bitter-, tasting or both sweet- and also unpleasant-, in particular bitter-, tasting substances or mixtures of substances.

Further aspects of the present invention and preferred embodiments of it will emerge from the following description and the attached claims.

Foodstuffs or semi-luxury products, with a high sugar content (especially sucrose (=saccharose), lactose, glucose or fructose or mixtures of these), are generally particularly preferred by consumers because of their sweetness. On the other hand, it is well known that a high content of easily metabolizable carbohydrates results in a sharp increase in the blood sugar level, and the formation of fatty deposits and ultimately can lead to health problems such as obesity, adiposity, insulin-resistance, adult-onset diabetes and the associated conditions of these. In particular this is compounded by the fact that many of the stated carbohydrates can also have an adverse effect on dental health, since they are broken down in the oral cavity by certain kinds of bacteria into lactic acid, for example, which can attack the dental enamel of young and adult teeth (tooth decay).

It has therefore long been an objective to reduce the sugar content of foodstuffs and/or semi-luxury foods to the absolute minimum or below. One such measure is the use of sweeteners. These are substances which in themselves have no or only a very low calorific value and which at the same time bring about a strong sweet taste impression; these substances are as a rule non-cariogenic (an overview can be found, by way of example, in the Journal of the American Dietetic Association 2004, 104 (2), 255-275).

So-called bulk sweeteners such as sorbitol, mannitol or other sugar alcohols are indeed to some extent exceptional sweeteners and can also partly replace the other characteristics of sugar for food technology purposes, but if these are ingested too often they can cause osmotic related digestive problems in some people.

Non-nutritious, highly intensive sweeteners are in fact, due to their low usage concentration, well suited to providing sweetness in foodstuffs, but often demonstrate taste problems due to a time-intensity profile that differs from that of sugar (e.g. sucralose, steviosides, cyclamate), a bitter and/or astringent aftertaste (e.g. acesulfame K, saccharin, stevioside, rebaudioside) and/or pronounced additional flavor impressions (e.g. glycyrrhizic acid ammonium salt). Some of these sweeteners are not particularly stable under heat (e.g. thaumatin, brazzein, monellin), are not stable in all applications (e.g. aspartame) and in some cases have a long-lasting sweetening effect (strong sweet aftertaste, e.g. saccharin, sucralose). An alternative—without using non-nutrient sweeteners—consists of lowering the sugar content of foodstuffs and/or semi-luxury foods and using sensorially weak or imperceptible substances, which intensify the sweetness indirectly or directly, as described in WO 2005/041684 for example. In EP 1 291 342 such substances of a natural origin (pyridinium betaine) are described; however these do not selectively influence the sweet taste, but also other taste directions such as umami or saltiness. In addition purification of the disclosed substances is complicated.

In WO 2007/014879 A1 the use of hesperetin and in WO 2007/107596 A1 phloretin as an intensifier of the sweet flavor of sugar-reduced preparations for food or pleasure is recommended. Occasionally, however, when using hesperetin and phloretin the comparative weakness of the intensification of sweetness in foodstuffs and semi-luxury foods e.g. in yogurt products, containing high proportions of proteins, in particular denatured proteins or polysaccharides, can be a disadvantage. Hesperetin also has the disadvantage in very acidic and carbonized applications such as lemonades and cola drinks, that it is not sufficiently effective.

It is therefore desirable to find substances which in low concentrations effectively intensify sweet taste impressions of sweet substances, preferably the sweet taste impression of sugar-reduced foodstuffs and semi-luxury foods, in particular of sugar-reduced foodstuffs and semi-luxury foods with a low pH value, without adversely affecting the flavor profile.

The primary object for the present invention was to indicate a way of influencing the strength of taste impressions of sweet-tasting and/or unpleasant-, in particular bitter-, tasting or both sweet- and also unpleasant-, in particular bitter-, tasting substances or mixtures of substances. The substances to be used to influence the strength of taste impressions should be widely applicable and preferably easily available. More preferably these substances should be suitable both for masking or reducing an unpleasant taste impression, in particular a bitter taste impression of a bitter-tasting substance or mixture of substances, and for intensifying a sweet taste impression of a sweet-tasting substance or mixture of substances preferably in a synergistic fashion.

Non-nutrient, highly intensive sweeteners often exhibit taste problems (as described above). The steviol glycosides (for example stevioside, rebaudioside A-H, dulcoside, rubusoside, suavioside A, B and G-J) naturally occurring in *Stevia* ssp. or *Rubus* ssp., while being very good sweeteners, at the concentrations necessary for an adequate sweetening effect (for example 400-600 ppm for rebaudioside A [purity>90%] in soft drinks, in order to achieve a sweetness corresponding to a concentration of sucrose of 10% by weight) already exhibit a pronounced licorice-like and unpleasant bitter and astringent off-taste and/or aftertaste.

In particular in sweet, calorie-free or low-calorie drinks, which have been manufactured with the help of such sweeteners, this unpleasant off-taste and/or aftertaste frequently lowers the sensory acceptance and should therefore be masked.

In the literature a number of possibilities have been offered for this. Thus in US 2004/0142084 alkaline metal hydrogen sulfates are described as masking agents. These increase the acid content in applications sharply, however. In U.S. Pat. No. 3,924,017 caffeic acid derivatives have been proposed for masking. The disadvantage is that caffeic acid itself has a slightly bitter taste and easily suppresses the sweetness, so that more sweetener would have to be used.

In WO 2006/087991 the unpleasant taste is suppressed by alkamides such as spilanthol; often, however, the tingling effect of this substance group is not desired here so that these do not have wide application.

An improvement in the taste features, in particular concerning the problem of aftertaste of non-nutrient, high intensity sweeteners can be achieved by using tannic acid, e.g. as described in WO 98/20753, or phenolic acids, e.g. as described in U.S. Pat. No. 3,924,017. However, because of their catechol units such substances are not particularly stable in applications and as typical astringents intensify a bitter and/or astringent off-taste and/or aftertaste.

Not only the abovementioned steviol glycosides, but also other substances, with a bitter taste or aftertaste, can in foodstuffs or semi-luxury foods sharply reduce the quality of these (e.g. flavonoid glycosides and limonoids in citrus juices, artificial sweeteners such as aspartame or saccharin, hydrophobic amino acid and/or peptides in cheese), even though substances with such taste directions may be desirable in moderation and characteristic of such foodstuffs or semi-luxury foods (e.g. caffeine in tea and coffee, quinine in so-called bitter lemon drinks, hop extracts in beer).

In particular to lower the natural content of bitter substances a subsequent treatment is therefore often necessary, for example extractively such as with the decaffeination of tea or coffee, or enzymatically, such as for example with the treatment of orange juice with a glycosidase in order to destroy the bitter naringin or use of special peptidases in the ripening of cheese. This treatment places a strain on the product, generates waste materials and also causes, for example, solvent residues and other residues (enzymes) in the products.

It is particularly important to suppress an unpleasant taste impression, in particular a bitter taste impression, in many pharmaceutical active substances, since in this way the readiness of patients, in particular patients sensitive to a bitter taste such as children, to take the preparation orally, can be considerably increased. Many pharmaceutically active substances such as aspirin, salicin, paracetamol, ambroxol or quinine, to name but a few and for clarification purposes, have a pronounced bitter, astringent and/or metallic taste or aftertaste.

Indeed a number of substances are already known which are able to suppress a bitter taste (at least in part), but in application these often prove to have major restrictions (see Ley JP (2008), Masking Bitter Taste by Molecules, Chemosensory Perception, 1(1), 58-77). Thus Lactisol has been used as a bitter masking agent, but at the same time this demonstrates a sweetness-masking effect. Sodium salts are for example also effective bitter masking agents, but are naturally salty or contribute to an increase in the sodium concentration in the foodstuff which is undesirable on health grounds.

The primary object for the present invention is achieved by the use of the compound Formula (I) 1-(2,4-dihydroxy-phenyl)-3-(3-hydroxy-4-methoxy-phenyl)-propan-1-one (i.e. deoxy hesperetin dihydrochalcone),

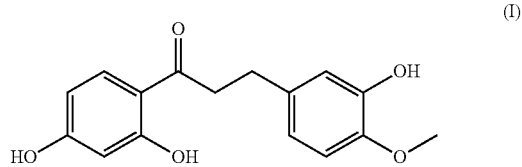

or
   a salt of the deoxy hesperetin dihydrochalcone (I) or a mixture comprising or consisting of a plurality of salts of the deoxy hesperetin dihydrochalcone (I)

or
   a mixture comprising or consisting of deoxy hesperetin dihydrochalcone (I) and a salt or a plurality of salts of the deoxy hesperetin dihydrochalcone (I), in order to influence the strength of the taste impressions of sweet-tasting, unpleasant-, in particular bitter-, tasting or both sweet- and unpleasant-, in particular bitter-, tasting substances or mixtures of substances.

Preferably the influencing of the strength of taste impressions involves
   the sweet taste impression of a sweet-tasting substance or mixture of substances being intensified and/or
   the unpleasant taste impression and an unpleasant-tasting substance or mixture of substances, in particular the bitter taste impression of a bitter-tasting substance or mixture of substances is reduced or masked and/or
   the sweet taste impression of a both sweet-tasting and also unpleasant-, in particular bitter-, tasting substance or mixture of substances is intensified and the unpleasant, in particular bitter, taste impression of the both sweet- and also unpleasant-, in particular bitter-, tasting substance or mixture of substances is reduced or masked.

The latter variant of the influencing according to the invention of taste impressions is particularly preferred.

Also preferred is an application of deoxy hesperetin dihydrochalcone (I) or a salt of the deoxy hesperetin dihydrochalcone (I) or a mixture comprising or consisting of a plurality of salts of deoxy hesperetin dihydrochalcone (I) or a mixture comprising or consisting of deoxy hesperetin dihydrochalcone (I) and a salt or a plurality of salts of the deoxy hesperetin dihydrochalcone (I), wherein the sweet taste impression of a sweet-tasting substance or mixture of substances or a both sweet- and unpleasant-, in particular bitter-, tasting substance or mixture of substances is synergistically intensified.

Preferably deoxy hesperetin dihydrochalcone (I) or a salt of deoxy hesperetin dihydrochalcone (I) or a mixture comprising or consisting of a plurality of salts of the deoxy hesperetin dihydrochalcone (I) or a mixture comprising or consisting of deoxy hesperetin dihydrochalcone (I) and a salt or a plurality of salts of the deoxy hesperetin dihydrochalcone (I) is or are used in the manner described above in an aroma composition or in a preparation selected from the group consisting of preparations serving for nutrition, as food supplements, for oral care or pleasure, as cosmetic preparations, in particular for application in the region of the head, pharmaceutical preparations intended to be taken orally, flavoring mixtures for use in one of the abovementioned preparations, or semi-finished products for manufacturing one of the preparations mentioned above.

The synthesis of the compound (I) to be used according to the invention is possible through the aldol condensation of protected (preferably benzyl-protected) 2',4'-dihydroxyacetophenone with protected (preferably benzyl-protected) isovanillin. This reaction takes place particularly well with ethanolic potassium hydroxide solution. Subsequent reduction by hydrogen with the addition of a catalyst (e.g. Pd/C) leads to the deoxy hesperetin dihydrochalcone (I) (see Example 1). However, the use of various protective groups, other bases, different reducing agents and the performing of an acid catalyzed aldol reaction are also possible and obvious to a person skilled in the art.

The compound (I) itself is known from the literature and is described, inter alia, in *J. Agric. Food Chem.* 1981, 29(2), 305-312. A reference will also be found there to a derivative having an intensive sweet taste, but nothing is said about the taste of the deoxy hesperetin dihydrochalcone (1) itself. The reference, in *Acta Chimica Acad. Sci. Hung.* 1978, 98(2), 225-230, describes a β-D-glycosyl derivative as having intensive sweetness. In this article, however, the corresponding aglycone—thus deoxy hesperetin dihydrochalcone (I)—is also described as having weak sweetness. The focus of these investigations, however, was on powerful sweetening agents, and no reference is made to their sweetness intensifying effect.

In this connection it is interesting that the sweetness intensifying effect is not the same for all deoxy dihydrochalcones. Compared with structurally related substances (1)-(3) deoxy hesperetin dihydrochalcone (I) is, surprisingly, clearly the most powerful compound (see Application example 4).

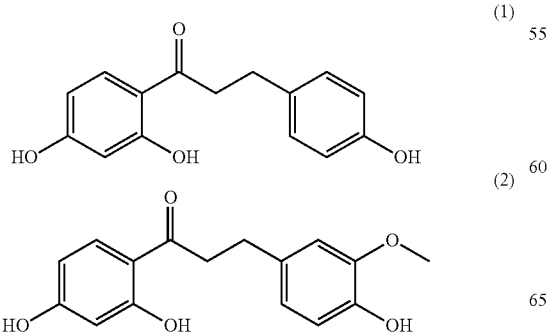

(1)

(2)

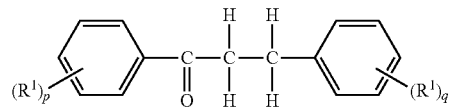

(3)

In document WO 93/10677 a structure class I-1 is disclosed, which inter alia would also include the deoxy hesperetin dihydrochalcone (I).

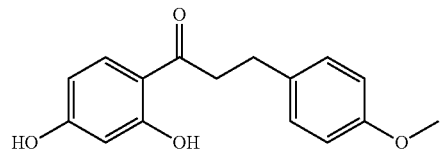

(I-1)

Specifically in this document, however only the glycoside I-2 of the deoxy hesperetin dihydrochalcone (I) is described as a taste correcting agent without an explicit example.

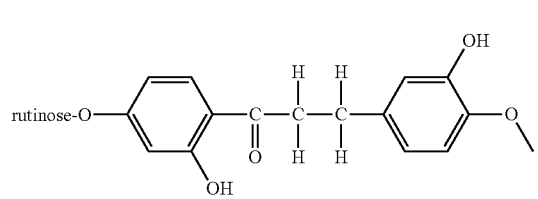

(I-2)

The relationships between structure and sweetening power were investigated as far back as 1979 (*J. Chem. Senses* 1979, 4(1), 35-47). It was found that the 3-hydroxy-4-methoxyphenyl group represents an important condition for a powerful sweetener, and reversing the substituents is associated with a loss of sweetening power. The intensively sweet tasting dihydrochalcone (4) and the surprisingly tasteless dihydrochalcone (5) are presented in this publication. The deoxy hesperetin dihydrochalcone (I) itself, as well as potential masking or sweetness intensifying features of these compounds are not described.

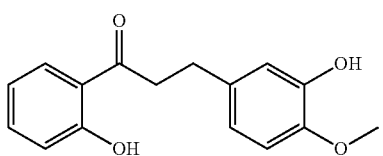

(4)

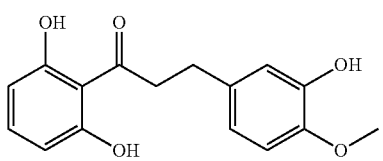

(5)

Furthermore, in U.S. Pat. No. 7,025,999 compounds—inter alia also dihydrochalcones—are described, which in chewing gum can achieve sensorial effects. Here the hydrochalcone (6) is described as intensively sweet. Masking features are not expressly described.

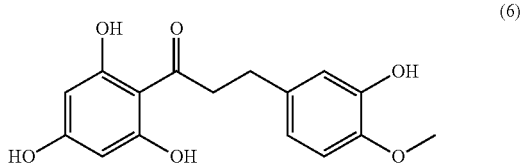 [SMILES: COc1ccc(CCC(=O)c2c(O)cc(O)cc2O)cc1O]

(6)

Compound (6) is likewise mentioned in the publication *J. Med. Chem.* 1981, 24(4), 408-428, which similarly deals with sweeteners based on a dihydrochalcone structure. The importance of the 3-hydroxy-4-methoxy-phenyl group for a clear sweetness impression is also emphasized here, and furthermore the 2,6-dihydroxy-substitution pattern of the remaining aromatic compounds is assumed to be particularly important for a strong sweetness impression.

In patent application EP 1 998 636, 4-hydroxydihydrochalcones of Formula (7) and their salts are described for the intensification of sweet sensorial impressions.

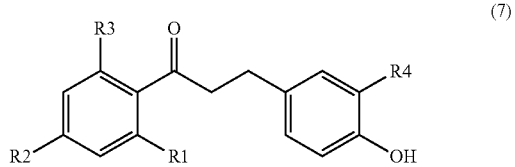

(7)

wherein
R1, R2, R3 and R4 independently of one another denote H, OH or O-alkyl (with preferably 1-4 C-atoms, i.e. preferably $C_1$ to $C_4$ alkoxy), respectively, on condition that at least one of the residues R1, R2 or R3 signifies OH. However, for the sweetness-intensifying effects found here a 4-hydroxy-substitution was necessary.

In our own investigations in the area of flavanoids and dihydrochalcones it was surprisingly found that deoxy hesperetin dihydrochalcone demonstrates a strong, sweetness-intensifying effect. Unlike the similar compounds already described, this compound is not in itself particularly sweet. Our own investigations have even shown that the sweetness-intensifying effect drops at higher concentrations (see Application example 3). These findings cannot be inferred from a synopsis of the documents cited, in particular because in many of these documents taste modulation has no part to play.

Deoxy hesperetin dihydrochalcone (I) is advantageously particularly well-suited to synergistic intensification of the sweet taste impression of a sweet-tasting substance and is easily accessible synthetically. A particularly advantageous, sweetness-intensifying effect of compound (I) results, if the sweet-tasting substance, the sweet taste impression of which is to be synergistically intensified according to the invention, is a sugar, in particular sucrose, glucose or fructose or a combination of two or all of these sugars. This particularly advantageous synergistic sweetness intensifying effect of deoxy hesperetin dihydrochalcone (I) is demonstrated further on by way of example using the intensification of the sweet taste impression of sucrose (see Application example 3).

In addition the deoxy hesperetin dihydrochalcone (I) is surprisingly also suitable for masking or reducing an unpleasant taste impression, in particular a bitter taste impression of a bitter-tasting substance (see Application example 1). Details and further aspects of the marking or reducing of unpleasant taste impressions are described further on.

With the salts of the deoxy hesperetin dihydrochalcone to be used according to the invention one, two or three hydroxy groups can be deprotonated, with a corresponding number of counter cations being present, wherein these are preferably selected from the group consisting of: singly positively charged cations of the first main and subsidiary group, ammonium ions, trialkylammonium ions, doubly positively charged cations of the second main and subsidiary group and triply positively charged cations of the third main and subsidiary group, as well as mixtures of these. Particularly preferably it is a case with these counter cations of cations selected from the group consisting of $Na^+$, $K^+$, $NH_4^+$, $Ca^{2+}$, $Mg^{2+}$, $Al^{3+}$ and $Zn^{2+}$.

Consequently, particular preference according to the invention is for the use of a salt or a mixture of two or more different salts of the deoxy hesperetin dihydrochalcone (I)

or deoxy hesperetin dihydrochalcone and one or a plurality of different salts of deoxy hesperetin dihydrochalcone (I), as described above, wherein the counter cation(s) of the, one, a plurality of or all the salts of the deoxy hesperetin dihydrochalcone (I) is or are selected from the group consisting of $Na^+$, $K^+$, $NH_4^+$, $Ca^{2+}$, $Mg^{2+}$, $Al^{3+}$ and $Zn^{2+}$.

For the salts upon which the deoxy hesperetin dihydrochalcone (I) is based, that stated above applies accordingly.

In our own investigations in connection with the present invention, it was surprisingly found that deoxy hesperetin dihydrochalcone (I) (advantageously even at just very low concentrations) can (in the ideal case completely) mask or (at least) reduce the unpleasant taste impression, in particular the bitter taste impression of a number of unpleasant or bitter-tasting substances, in particular of methylxanthines, such as, for example, caffeine, alkaloids, such as, for example, quinine, flavonoids, such as, for example, catechins, naringin, neohesperidin, phenol glycosides, such as, for example, salicin, arbutin, amygdalin or phenols, such as, for example, hydroxytyrosol or oleuropein, inorganic salts, such as potassium chloride or magnesium sulfate, pharmaceutical active substances, such as, for example, denatonium benzoate or beta-lactam antibiotics, or steviolglycosides, such as, for example, stevioside or rebaudiosides. The masking or reduction of the bitter taste impressions of the compounds mentioned in this paragraph is also preferred according to the invention.

Here it is particularly advantageous for the deoxy hesperetin dihydrochalcone (I) to be used according to the invention not to have any complexing features. Deoxy hesperetin dihydrochalcone (I) is consequently advantageously particularly well suited to both intensifying a pleasant taste impression, in particular the sweet taste impression of a sweet-tasting substance, in a synergistic manner, and also masking or reducing an unpleasant taste impression, in particular the bitter taste impression of a bitter-tasting substance, wherein preferably both effects occur simultaneously.

A further aspect related to the present invention, therefore concerns the use (a)—of deoxy hesperetin dihydrochalcone (I)

or a salt of the deoxy hesperetin dihydrochalcone (I) or a mixture comprising or consisting of a plurality of salts of the deoxy hesperetin dihydrochalcone (I)

or
a mixture comprising or consisting of
deoxy hesperetin dihydrochalcone (I) and
a salt or a plurality of salts of the deoxy hesperetin dihydrochalcone (I),
as described in each case above,
in a mixture comprising
one or more sweet-tasting substances (b)
and/or
one or more unpleasant-, in particular bitter-tasting substance(s) (c)
and/or
one or more both sweet- and unpleasant-tasting substance(s) (d),
(a) for the synergistic intensification of the sweet taste of the substance(s) (b) or (d)
and/or
(b) for masking or reducing the unpleasant taste impression of the unpleasant-tasting substance(s) (c) or (d).

That stated above concerning deoxy hesperetin dihydrochalcone (I), its salts or mixtures comprising or consisting of a plurality of salts of the deoxy hesperetin dihydrochalcone (I) or mixtures comprising or consisting of deoxy hesperetin dihydrochalcone (I) and a salt or a plurality of salts of the deoxy hesperetin dihydrochalcone (I) applies here accordingly.

Preferably the mixture is an aroma composition or preparation selected from the group consisting of preparations serving for nutrition, as food supplements, for oral care or for pleasure, as cosmetic preparations, in particular for application in the region of the head, pharmaceutical preparations intended to be taken orally, flavoring mixtures for use in one of the abovementioned preparations, or semi-finished products for manufacturing one of the preparations mentioned above.

Sweet-tasting substances for the purposes of the present invention are in particular:
sweet-tasting carbohydrates
(e.g. sucrose, trehalose, lactose, maltose, melizitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde),
sweet-tasting sugar alcohols
(e.g. erythritol, threitol, arabitol, ribitol, xylitol, sorbitol, mannitol, dulcitol, lactitol),
sweet-tasting proteins
(e.g. miraculin, pentadin, monellin, thaumatin, curculin, brazzein),
sweeteners
(e.g. magap, sodium cyclamate, acesulfame K, neohesperidine dihydrochalcone, naringin hydrochalcone, saccharin, saccharin sodium salt, aspartame, superaspartame, neotame, sucralose, lugduname, carrelame, sucrononate, sucrooctate or
naturally occurring sweeteners such as miraculin, curculin, monellin, mabinlin, thaumatin, curculin, brazzein, pentadin, D-phenylalanine, D-tryptophan, or extracts or fractions derived from natural sources containing these amino acids and/or proteins, neohesperidin dihydrochalcone, steviolgylcosides, steviosides, steviolbioside, rebaudiosides, rebaudioside A, rebaudioside B, rebaudioside C, rebaudioside D, rebaudioside E, rebaudioside F, rebaudioside G, rebaudioside H, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin 2, strogin 4, selligueanin A, dihydroquercetin-3-acetate, perillartine, telosmoside $A_{15}$, periandrin I-V, pterocaryoside, cyclocaryoside, mukurozioside, trans-anethole, trans-cinnamaldehyde, bryosides, bryonosides, bryonodulcosides, carnosiflosides, scandenosides, gypenosides, trilobtain, phloridzin, dihydroflavanols, hematoxylin, cyanin, chlorogenic acid, albiziasaponin, telosmosides, gaudichaudioside, mogrosides, hernandulcines, monatin, glycyrrhetin acid and derivatives and salts thereof and phyllodulcin).

Apart from the sweet primary taste, sweet-tasting substances can have one or more further test impressions (and/or olfactory impressions), in particular a non-sweet aftertaste impression. Here primary taste means the taste impression that is made while substance is in direct contact with the mucous lining of the oral cavity, in particular with the tongue (as a rule lasting from a few seconds to a few minutes). Aftertaste here means the taste impression that is left once the oral cavity has been emptied by swallowing and/or disgorging and which through the adhesion of residues of the substance remains in place and can stay there for between a few minutes and a few hours.

In particular sweet-tasting substances, as mentioned in the introduction, can also have unpleasant, in particular bitter, taste impressions. In order to influence the taste impressions of such both sweet- and unpleasant-, in particular bitter-, tasting substances (d) hesperetin dihydrochalcone (I) or a salt of the deoxy hesperetin dihydrochalcone (I) or a mixture comprising or consisting of a plurality of salts of deoxy hesperetin dihydrochalcone (I) or a mixture comprising or consisting of deoxy hesperetin dihydrochalcone (I) and a salt or a plurality of salts of the deoxy hesperetin dihydrochalcone (I) are preferably used. The presence of other taste impressions of a substance, but also the intensity of the primary taste itself can, for example, vary according to the concentration of the substance, the temperature, the pH and/or the other substances present apart from this substance.

Thus for example when dealing with stevioside or rebaudioside A or another steviolglycoside (as described above), it is the case that the sweetening power of these will be dependent upon various factors such as temperature, pH, concentration and the product to be sweetened. In particular according to the concentration (at high concentrations, especially at more than 50 ppm, particularly at 50-2000 ppm, quite particularly at 100 ppm-1000 ppm) a bitter aftertaste occurs, which as a rule is undesired. In the context of the present invention stevioside or rebaudioside A are particularly preferably both sweet and bitter tasting substances (d).

The unpleasant-, in particular bitter-, tasting substances can apart from an unpleasant taste also have other, (often not unpleasant) taste or odor qualities. For the purposes of this invention not unpleasant taste qualities include for example spicy, umami, sweet, salty, sour, sharp, cooling, warming, burning or tingling sensations.

Unpleasant-, in particular bitter-, tasting substances with additional sweet taste impression are for the purposes of this invention in turn classified as both sweet- and unpleasant-tasting substances.

In the context of the present invention the respective unpleasant taste impressions are similarly to be assigned corresponding taste impressions determined by an aftertaste.

Unpleasant-tasting substances for the purposes of this invention are therefore:
- substances with a bitter, astringent, cardboardy, chalky, dusty, dry, floury, rancid or metallic taste, and
- substances with a corresponding (possibly long-lasting) aftertaste.

Here a bitter taste impression is often associated with the astringent, cardboardy, chalky, dusty, dry, floury, rancid and/or metallic taste impressions.

Substances (c), which taste unpleasant, i.e. bitter, astringent, cardboardy, chalky, dusty, dry, floury, rancid or metallic taste, are for example:
xanthine alkaloids, xanthines (caffeine, theobromine, theophylline), alkaloids (quinine, brucine, strychnine, nicotine), phenolic glycosides (e.g. salicin, arbutin), flavonoid glycosides (e.g. hesperidine, naringin), chalcones or chalcone glycosides, hydrolysable tannins (gallic or ellagic acid esters of carbohydrates, e.g. pentagalloylglucose), non-hydrolysable tannins (optionally galloylated catechols or epicatechols and oligomers thereof, e.g. proanthyocyanidines or procyanidines, thearubigin), flavones (e.g. quercertin, taxifolin, myricetin), other polyphenols (gamma-oryzanol, coffeic acid or esters thereof), terpenoid bitter substances (e.g. limonoids such as limonine or nomilin from citrus fruits, lupolones and humulones from hops, iridoids, secoiridoids), absinthin from wormwood, amarogentin from gentian, metal salts (potassium chloride, sodium sulfate, magnesium salts, iron salts, aluminum salts, zinc salts), pharmaceutical active ingredients (e.g. fluoroquinolone antibiotics, paracetamol, aspirin, beta-lactam antibiotics, ambroxol, propylthiouracil [PROP], guaifenesin), vitamins (for example vitamin H, vitamins from the B group, such as vitamin B1, B2, B6, B12, niacin, pantothenic acid), denatonium benzoate or other denatonium salts, sucralose octaacetate, urea, unsaturated fatty acids, in particular unsaturated fatty acids in emulsions, amino acids (e.g. leucine, isoleucine, valine, tryptophan, proline, histidine, tyrosine, lysine or phenylalanine), peptides (in particular peptides having an amino acid from the group leucine, isoleucine, valine, tryptophan, proline or phenylalanine at the N- or C-terminus).

Substances, in particular aromatic substances or flavorings, often have a bitter, astringent, cardboardy, chalky, dusty, dry, floury, rancid and/or metallic aftertaste, though they have a not unpleasant (primary) taste for the purposes of the above definition (i.e. e.g. sweet, salty, spicy, sour, etc.) and/or smell. These aromatic substances or flavorings with an unpleasant (after-) taste are unpleasant-tasting substances (c) or in particular (where they have a sweet (primary) taste) both sweet- and also unpleasant-tasting substances (d) for the purposes of this invention. These aromatic substances or flavorings are in particular selected from the group of sweeteners (as described above) or sugar substitutes, i.e. these aromatic substances or flavorings have a sweet (primary) taste. Specific examples of such aromatic substances or flavorings are aspartame, neotame, superaspartame, saccharin, sucralose, tagatose, monellin, stevioside, rebaudioside, above all rebaudioside A, mogroside, in particular mogroside V, thaumatin, miraculin, glycyrrhizin, glycyrrhetinic acid or derivatives thereof, cyclamates or the pharmaceutically acceptable salts of the above-mentioned compounds. The aromatic substances or flavorings are preferred both sweet- and unpleasant/bitter-tasting substances (d) for the applications according to the invention. The unpleasant taste impression of these substances, in particular a bitter taste impression of these substances, in a use according to the invention (as described above) can be particularly effectively masked or reduced.

Further unpleasant-tasting substances (c) or both sweet- and unpleasant-tasting substances (d), the unpleasant (after) taste of which according to the invention can be advantageously masked or reduced, are for example aromatic substances which have a sweet taste impression and are preferably selected from the group consisting of: vanillin, ethylvanillin, 2-hydroxy-4-methoxybenzaldehyde, ethylvanillin isobutyrate (=3-ethoxy-4-isobutyryloxybenzaldehyde), Furaneol® (2,5-dimethyl-4-hydroxy-3(2H)-furanone) and derivatives thereof (e.g. homofuraneol, 2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3 (2H)-furanone), maltol and derivatives thereof (e.g. ethylmaltol), coumarin and derivatives thereof, gamma-lactones (e.g. gamma-undecalactone, gamma-nonalactone), delta-lactones (e.g. 4-methyl-delta-lactone, massoilactone, delta-decalactone, tuberolactone), methyl sorbate, divanillin, 4-hydroxy-2(or 5)-ethyl-5(or 2)-methyl-3(2H)furanone, 2-hydroxy-3-methyl-2-cyclopentenones, 3-hydroxy-4,5-dimethyl-2(5H)-furanone, fruit esters and fruit lactones (e.g. n-butyl acetate, isoamyl acetate, ethyl propionate, ethyl butyrate, n-butyl butyrate, isoamyl butyrate, ethyl 3-methyl-butyrate, ethyl n-hexanoate, allyl n-hexanoate, n-butyl n-hexanoate, ethyl n-octanoate, ethyl-3-methyl-3-phenylglycidate, ethyl-2-trans-4-cis-decadienoate), 4-(p-hydroxyphenyl)-2-butanone, 1,1-dimethoxy-2,2,5-trimethyl-4-hexane, 2,6-dimethyl-5-hepten-1-al and phenylacetaldehyde.

Particular preference is for a use according to the invention (as described above), wherein the bitter-tasting substance (c) or the both sweet- and bitter-tasting substance (d), is selected from the group consisting of steviolglycosides, in particular stevioside and rebaudiosides. The bitter-tasting substance (c) or the both sweet- and bitter-tasting substance (d) is preferably selected from the group consisting of rebaudioside A, rubusoside, dulcoside, mogroside, phyllodulcin, glycyrrhetin acid or extracts of *Stevia* ssp. (in particular *Stevia rebaudiana*), Luo Han Guo, *Rubus suavissimus, Hydrangea dulcis* or *Glycyrrhyza glabra*.

Through the use according to the invention of deoxy hesperetin dihydrochalcone (I) or a salt of the deoxy hesperetin dihydrochalcone (I) or a mixture comprising or consisting of a plurality of salts of the deoxy hesperetin dihydrochalcone (I) or a mixture comprising or consisting of deoxy hesperetin dihydrochalcone (I) and a salt or a plurality of salts of the deoxy hesperetin dihydrochalcone (I) the overall content of sweet-tasting substances (e.g. in the preparations intended for nutrition or pleasure) can be advantageously reduced, without reducing the overall sweet taste impression. This is not only important on health grounds, but also in terms of the taste features. In particular, a sweet- (and at high concentrations also bitter-) tasting substance such as for example stevioside can be used in combination with deoxy hesperetin dihydrochalcone (I) or a salt of the deoxy hesperetin dihydrochalcone (I) or a mixture comprising or consisting of a plurality of salts of the deoxy hesperetin dihydrochalcones (I) or a mixture comprising or consisting of deoxy hesperetin dihydrochalcone (I) and a salt or a plurality of salts of the deoxy hesperetin dihydrochalcone (I) advantageously (maintaining the sweet taste impressions) in concentrations that are small enough so that no or at least only a reduced bitter (after)taste of the both sweet- and bitter-tasting substance such as for example of stevioside is noticed. In addition, the bitter taste impression (of the both sweet- and bitter-tasting substance) can be advantageously masked or at least (further) reduced by a preferred use according to the invention (as described above).

Various studies with *Stevia* extracts (Yamada A. et al. (1985): Chronic toxicity study of dietary *Stevia* extracts in F344 rats. In: J. Food Hyg. Soc. Japan. Bd. 26, S. 169-183; Melis, M. S. (1999): Effects of chronic administration of *Stevia rebaudiana* on fertility in rats. In: J. Ethnopharmacol. Bd. 67, S. 157-161) have reported on the effects on the human reproduction system, such as for example reduced spermatogenesis, lower weight of the seminal vesicles and interstitial cell proliferation in the testicles. It is also known that the leaves of *Stevie rebaudiana* have been used by Paraguayan Indians in tea as a male contraceptive.

Through the synergistic sweetness-intensifying effect of deoxy hesperetin dihydrochalcone (I) or its salts the quantity of *Stevia* extract or steviol glycosides, in particular of stevioside, needed for a certain level of sweetness, can be advantageously reduced by combination with deoxy hesperetin dihydrochalcone (I) or salts thereof (while maintaining the desired level of sweetness), so that (should these exist) adverse effects (as described above) can be reduced or avoided.

In addition, a reduction in the quantity of *Stevia* extract or steviol glycosides required can also result in cost savings on top of the advantages already mentioned.

In a use according to the invention it can be advantageous if not all unpleasant- or bitter-tasting nuances are (completely) masked, since in some circumstances these can also be desirable.

In a use according to the invention (as described above) it is also a case preferably of a preparation intended as an oral pharmaceutical, as a cosmetic, for nutrition, as a food supplement, for oral care or pleasure. Preparations according to the invention and their preferred embodiments are described further on.

A further object for the present invention was to provide an aroma composition, with which the strength of taste impressions of sweet-tasting, and/or unpleasant-, in particular bitter-tasting and/or both sweet- and unpleasant-, in particular bitter-, tasting substances is influenced, in particular the sweet taste impression of a sweet-tasting substance, is preferably synergistically intensified and—where the sweet-tasting substance has a bitter off- and/or aftertaste—preferably in addition the bitter taste impression is masked or reduced. It is similarly preferred that the strength of an unpleasant (in particular bitter) taste impression of substances or mixtures of substances without a sweet taste is masked or reduced.

Consequently deoxy hesperetin dihydrochalcone (I) or a salt of the deoxy hesperetin dihydrochalcone (I) or a mixture comprising or consisting of a plurality of salts of the deoxy hesperetin dihydrochalcone (I) or a mixture comprising or consisting of deoxy hesperetin dihydrochalcone (I) and a salt or a plurality of salts of the deoxy hesperetin dihydrochalcone (I) according to a further aspect of this invention in an aroma composition is used for preferably synergistic intensification of the sweet taste of a sweet-tasting substance and/or for masking or reducing a bitter taste impression of a bitter-tasting substance. Such an aroma composition is advantageously particularly well-suited to preferably synergistic intensification of a sweet and/or for masking or reducing a bitter taste impression of a both sweet- and bitter-tasting substance.

Consequently this invention also concerns an aroma composition comprising or consisting of the following components:

(a)—deoxy hesperetin dihydrochalcone (I),
or
a salt of deoxy hesperetin dihydrochalcone (I), or a mixture comprising or consisting of a plurality of salts of the deoxy hesperetin dihydrochalcone (I),
or
a mixture comprising or consisting of
deoxy hesperetin dihydrochalcone (I) and
a salt or a plurality of salts of deoxy hesperetin dihydrochalcone (I),
and
(b) one or more sweet-tasting substances
and/or
(c) one or more unpleasant, in particular bitter-tasting substances,
and/or
(d) one or more both sweet- and unpleasant-, in particular bitter-, tasting substances;
and if applicable
(e) one or more substances to mask or reduce an unpleasant, in particular a bitter, taste impression
and/or
(f) one or more further substances for intensifying a sweet taste impression,
and/or
(g) one or more substances to mask or reduce a metallic, chalky, sour, or astringent taste impression,
and/or
(h) one or more substances to intensify a salty or umami taste impression;
wherein components (b)-(h) are not deoxy hesperetin dihydrochalcone (I) nor a salt of the deoxy hesperetin dihydrochalcone (I) and neither do they contain these.

A or the sweet-tasting substance(s) (b) is or are preferably selected from the group consisting of vanillin, ethylvanillin, ethylvanillin isobutyrate (=3-ethoxy-4-isobutyryloxybenzaldehyde), Furaneol® (2,5-dimethyl-4-hydroxy-3(2H)-furanone) and derivatives thereof (e.g. homofuraneol, 2-ethyl-4-hydroxy-5-methyl-3(2H)-furanone), homofuronol (2-ethyl-5-methyl-4-hydroxy-3(2H)-furanone and 5-ethyl-2-methyl-4-hydroxy-3(2H)-furanone), maltol and derivatives thereof (e.g. ethylmaltol), coumarin and derivatives thereof, gamma-lactones (e.g. gamma-undecalactone, gamma-nonalactone), delta-lactones (e.g. 4-methyl-delta-lactone, massoilactone, delta-decalactone, tuberolactone), methyl sorbate, divanillin, 4-hydroxy-2(or 5)-ethyl-5(or 2)-methyl-3(2H)furanone, 2-hydroxy-3-methyl-2-cyclopentenones, 3-hydroxy-4,5-dimethyl-2(5H)-furanone, fruit esters and fruit lactones (e.g. n-butyl acetate, isoamyl acetate, ethyl propionate, ethyl butyrate, n-butyl butyrate, isoamyl butyrate, ethyl 3-methyl-butyrate, ethyl n-hexanoate, allyl n-hexanoate, n-butyl n-hexanoate, ethyl n-octanoate, ethyl-3-methyl-3-phenylglycidate, ethyl-2-trans-4-cis-decadienoate), 4-(p-hydroxyphenyl)-2-butanone, 1,1-dimethoxy-2,2,5-trimethyl-4-hexane, 2,6-dimethyl-5-hepten-1-al, phenylacetaldehyde, sucrose, trehalose, lactose, maltose, melizitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, erythritol, threitol, arabitol, ribitol, xylitol, sorbitol, mannitol, dulcitol and lactitol.

A or the unpleasant-, in particular bitter-, tasting substance(s) (c) is or are preferably selected from the group consisting of xanthine alkaloids, xanthines (caffeine, theobromine, theophylline), alkaloids (quinine, brucine, strychnine, nicotine), phenolic glycosides (e.g. salicin, arbutin), flavonoid glycosides (e.g. hesperidine, naringin), chalcones or chalcone glycosides, hydrolysable tannins (gallic or ellagic acid esters of carbohydrates, e.g. pentagalloylglucose), non-hydrolysable tannins (optionally galloylated catechols or epicatechols and oligomers thereof, e.g. proanthyocyanidines or procyani-dines, thearubigin), flavones (e.g. quercertin, taxifolin, myricetin), other polyphenols (gamma-oryzanol, coffeic acid or esters thereof), terpenoid bitter substances (e.g. limonoids such as limonine or nomilin from citrus fruits, lupolones and humulones from hops, iridoids, secoiridoids), absinthin from wormwood, amarogentin from gentian, metal salts (potassium chloride, sodium sulfate, magnesium salts, iron salts, aluminum salts, zinc salts), pharmaceutical active ingredients (e.g. fluoroquinolone antibiotics, paracetamol, aspirin, beta-lactam antibiotics, ambroxol, propylthiouracil [PROP], guaifenesin), vitamins (for example vitamin H, vitamins from the B group, such as vitamin B1, B2, B6, B12, niacin, pantothenic acid), denatonium benzoate or other denatonium salts, sucralose octaacetate, urea, unsaturated fatty acids, in particular unsaturated fatty acids in emulsions, amino acids (e.g. leucine, isoleucine, valine, tryptophan, proline, histidine, tyrosine, lysine or phenylalanine), peptides (in particular peptides having an amino acid from the group leucine, isoleucine, valine, tryptophan, proline or phenylalanine at the N- or C-terminus).

A or the both sweet- and unpleasant-tasting substances (d) is or are preferably selected from the group consisting of steviolglycosides (in particular stevioside and rebaudioside A), rubusoside, dulcoside, mogroside, phyllodulcin, glycyrrhetin acid or extracts of *Stevia* ssp. (in particular *Stevia rebaudiana*), Luo Han Guo, *Rubus suavissimus, Hydrangea dulcis, Glycyrrhyza glabra*, magap, sodium cyclamate, acesulfame K, neohesperidine dihydrochalcone, naringin hydrochalcone, saccharin, saccharin sodium salt, aspartame, superaspartame, neotame, alitame, sucralose, lugduname, carrelame, sucrononate, sucrooctate.

A or the substance(s) (e) to mask or reduce a bitter taste impression is or are preferably selected from the group consisting of sodium salts (e.g. sodium chloride, sodium lactate, sodium citrate, sodium acetate, sodium gluconoate), homoeriodictyol or its sodium salts, 2,4-dihydroxybenzoic acid vanillyl amide, gamma-aminobutyric acid, pellitorine (in particular as described in EP 2008530 A1) and gingerdione.

A or the substance(s) (f) for intensifying a sweet taste impression, is or are preferably selected from the group consisting of hesperetin (in particular as disclosed in WO 2007/014879), hydroxyphenylalkane diones (in particular those described in WO 2007/003527), deoxybenzoins (in particular as described in WO 2006/106023 and German patent application DE10 2009 002 268.6), 4-hydroxychalcones (in particular as described in WO 2007/107596), propenylphenylglycosides (chavicol glycosides) (in particular as described in EP 1 955 601 A1) and divanillins (in particular as described in WO 2004/078302).

The abovementioned documents are, with regard to the corresponding compounds disclosed therein, by way of reference part of this application.

An aroma composition according to the invention preferably comprises at least one or more further substance(s) (g) to mask or reduce a metallic, chalky, sour or astringent taste impression and/or a or a plurality of further substance(s) (h) to intensify a salty or umami taste impression. Preferred further substances to mask or reduce an unpleasant taste impression and/or to intensify a pleasant taste impression are described further on.

Particular preference is for an aroma composition (as described above), wherein the bitter-tasting substance (c) or the both sweet- and also bitter-tasting substance (d) is selected from the group consisting of steviglycosides, in particular stevioside and rebaudiosides, preferably selected from the group consisting of rebaudioside A, rubusoside, dulcoside, mogroside, phyllodulcin, glycyrrhetin acid or extracts of *Stevia* ssp. (in particular *Stevia rebaudiana*), Luo Han Guo, *Rubus suavissimus, Hydrangea dulcis* or *Glycyrrhyza glabra*.

In particular the present invention also concerns a use of an aroma composition according to the invention (as described above) for the synergistic Intensification of the sweet taste of a sweet-tasting substance or mixture of substances (b) and/or to mask or reduce an unpleasant, in particular bitter taste impression of an unpleasant-, in particular bitter- tasting substance or mixture of substances (c) and/or for intensifying the sweet taste impressions and/or to reduce or mask the unpleasant, in particular bitter, taste impressions of the both sweet- and unpleasant-, in particular bitter-, tasting substance or mixture of substances (d) in a preparation intended as an oral pharmaceutical, as a cosmetic, for nutrition, as a food supplement, for oral care or pleasure, in particular in preparations according to the invention as described below. Particularly preferably an aroma composition according to the invention is used to improve the sensorial profile of sweet products for oral consumption.

Consequently the present invention also concerns a preparation comprising an aroma composition according to the invention as described above. The preparation according to the invention is preferably a preparation selected from the group consisting of preparations intended for nutrition, as a food supplement, for oral care or pleasure, cosmetic preparations, in particular for application in the region of the head, pharmaceutical preparations intended to be taken orally, flavoring mixtures for use in one of the abovementioned preparations, or semi-finished products for manufacturing one of the preparations mentioned above.

A person skilled in the art will understand that the individual ingredients of the aroma composition according to the invention must be present in the preparation according to the invention. According to the invention it is unimportant here if these ingredients are introduced into the preparation together or successively.

Particular preference is for a preparation intended for nutrition, as a food supplement, for oral care or pleasure, as a cosmetic or as a pharmaceutical to be taken orally (as described above) according to the invention, wherein the preparation based on the total weight of the preparation comprises 0.0001% by weight (1 ppm)—0.1% by weight (1000 ppm), preferably 0.0001% by weight (1 ppm)—0.05% by weight (500 ppm), particularly preferably 0.001% by weight (10 ppm)—0.025% by weight (250 ppm), deoxy hesperetin dihydrochalcone (I) and its salts.

Preparations according to the invention can also be in the form of semi-finished products in particular for the manufacture of a preparation intended for nutrition, as a food supplement, for oral care or pleasure, as a cosmetic or as a pharmaceutical to be taken orally.

Particular preference is for a preparation according to the invention (as described above), wherein the preparation is a semi-finished product suitable for manufacturing a preparation intended for oral care or pleasure or as cosmetic preparation or as a pharmaceutical to be taken orally.

Particular preference is for a semi-finished product or flavoring mixture (as described above), wherein the semi-finished product based on the total weight of the semi-finished product or flavoring mixture comprises 0.0001% by weight—95% by weight, especially 0.001% by weight—95% by weight, preferably 0.001-80% by weight, particularly preferably 0.01% by weight—50% by weight, of the deoxy hesperetin dihydrochalcone (I) and its salts.

Particular preference is for a preparation according to the invention, in which the total quantity of (i) deoxy hesperetin dihydrochalcone (I) and (ii) its salts (component (a)) in the preparation is sufficient, compared with a preparation, which with an otherwise identical composition comprises neither (i) deoxy hesperetin dihydrochalcone (I) nor (ii) its salts, to bring about an increase in the sweetness impression to be measured in sucrose equivalents by 10% or more, preferably 20% or more, and particularly preferably 35% or more.

The preparations for nutrition or pleasure for the purposes of this invention are for example bakery products (for example bread, dry biscuits, cakes, other pastry products), confectionery (for example chocolates, chocolate bar products, other bar products, fruit gums, hard and soft caramels, chewing gum), alcoholic or non-alcoholic beverages (for example coffee, tea, wine, beverages containing wine, beer, beverages containing beer, liqueurs, spirits, brandies, fruit-containing beverages, isotonic beverages, soft drinks, nectars, fruit and vegetable juices, fruit or vegetable juice preparations), instant beverages (for example instant cocoa beverages, instant tea beverages, instant coffee beverages), meat products (for example ham, fresh or cured sausage preparations, spiced or marinated fresh or cured meat products), eggs or egg products (dried egg, egg white, egg yolk), cereal products (for example breakfast cereals, muesli bars, precooked ready rice products), dairy products (for example milk beverages, milk ice cream, yoghurt, kefir, curd cheese, soft cheese, hard cheese, dried milk powder, whey, butter, buttermilk, partially or fully hydrolyzed milk protein-containing products), products made from soya protein or other soya bean fractions (for example soya milk and products made therefrom, soya lecithin-containing preparations, fermented products such as tofu or tempe or products made therefrom, soy sauce), fruit preparations (for example jams, fruit ice cream, fruit sauces, fruit fillings), vegetable preparations (for example ketchup, sauces, dried vegetables, deep-frozen vegetables, precooked vegetables, preserved vegetables, boiled down vegetables), snack articles (for example baked or fried potato chips or potato dough products, bread dough products, maize- or peanut-based extrudates), fat- or oil-based products or emulsions thereof (for example mayonnaise, remoulade, dressings, flavoring preparations), other ready-to-serve meals and soups (for example dried soups, instant soups, precooked soups), spices, seasoning mixtures and in particular powdered seasonings, which are for example used in snack food applications. The preparations for the purposes of the invention may also be used as semi-finished products for the production of further preparations serving for nutrition or for pleasure. The preparations for the purposes of the invention may also be nutritional supplements in the form of capsules, tablets (uncoated and coated tablets, for example having coatings resistant to gastric juices), sugar-coated tablets, granules, pellets, mixtures of solids, dispersions in liquid phases, as emulsions, as powders, as solutions, as pastes or as other swallowable or chewable preparations.

Pharmaceutical preparations for oral consumption for the purposes of the invention are preparations for example in the form of capsules, tablets (uncoated and coated tablets, for example having coatings resistant to gastric juices), sugar-coated tablets, granules, pellets, mixtures of solids, dispersions in liquid phases, as emulsions, as powders, as solutions, as pastes or as other swallowable or chewable preparations and are used as medicines only available by prescription, from pharmacies or other medicines or as food supplements.

The preparations serving for oral care for the purposes of this invention are in particular oral and/or dental care products such as toothpastes, tooth gels, tooth powders, mouthwashes, chewing gums and other oral care products. Particular preference is for preparations serving for oral care, containing an extract or components of an extract of *Stevie* ssp. Deoxy hesperetin dihydrochalcone (I) is advantageously particularly well suited to masking or reducing in preparations serving for oral care containing steviolglycosides a bitter taste impression of the steviolglycosides, in particular of stevioside and/or rebaudioside A.

Cosmetic preparations, in particular cosmetic preparations for application in the region of the head, are in the context of this invention preferably cosmetic preparations that contain at least one unpleasant, in particular a bitter-tasting substance (c) and even when applied correctly to the skin can come into contact with the oral cavity. Such preparations are for example cosmetic preparations for application in the region of the head, such as soaps, other cleansing or care agents for the facial region, face creams or lotions or ointments, sun protection agents, beard cleansing or care agents, shaving foams, soaps or gels, lipsticks or other cosmetics for the lips, or lip care agents.

Particularly preferably the present invention concerns a preparation according to the invention (as described above), which comprises as an ingredient one or more both sweet and bitter-tasting substance(s) (d), wherein the total quantity of deoxy hesperetin dihydrochalcone (I) or salts of the deoxy hesperetin dihydrochalcone (I) in the preparation is sufficient to both synergistically intensify the sweet taste impression of the both sweet- and bitter-tasting substance(s) (d) and also to mask or reduce the bitter taste impression of the both sweet- and bitter-tasting substance(s) (d).

Particular preference is for a preparation according to the invention (as described above), in particular a preparation serving for nutrition, pleasure or oral care, wherein one, a plurality of or preferably all the both sweet- and bitter-tasting substance(s) (d) is or are selected from the group consisting of steviolglycosides, in particular from stevioside and rebaudioside A, preferably selected from the group consisting of rebaudioside A, rubusoside, dulcoside, mogroside, phyllodulcin, glycyrrhetin acid or extracts of *Stevia* ssp. (in particular *Stevia rebaudiana*), Luo Han Guo, *Rubus suavissimus*, *Hydrangea dulcis* or *Glycyrrhyza glabra*.

Further preference is for a preparation according to the invention (as described above), in which the total quantity of bitter-tasting substances (c) and/or both sweet- and bitter-tasting substances (d) in the preparation is sufficient, compared with a preparation, which with an otherwise identical composition comprises neither (i) deoxy hesperetin dihydrochalcone (I) nor (ii) its salts, to be perceived as a bitter taste, and the total quantity of (i) deoxy hesperetin dihydrochalcone (I) and (ii) its salts (component (a)) in the preparation is sufficient, to mask the bitter taste of the bitter-tasting substance(s) (c) or of the both sweet- and bitter-tasting substance(s) (d) or compared with a preparation which with an otherwise identical composition contains neither (i) deoxy hesperetin dihydrochalcone (I) nor (ii) its salts, to reduce these.

A preparation according to the invention preferably comprises also at least one further substance to mask or reduce a bitter, metallic, chalky, sour or astringent taste impression and/or to intensify a sweet, salty or umami taste impression.

Preference is also for a preparation according to the invention, in particular a preparation or semi-finished product (as described in each case above) serving for nutrition, oral care or pleasure or for cosmetics or intended for oral administration of pharmaceuticals, comprising an aroma composition according to the invention (as described above), wherein the aroma composition according to the invention as a proportion of the preparation according to the invention is 0.000001% by weight to 95% by weight, based on the total weight of the preparation.

A preparation according to the invention can also contain the normal active substances, base materials, inactive substances and additives for the preparations serving for nutrition, oral care or pleasure, cosmetics or oral pharmaceuticals (i.e. for oral application of certain pharmaceutical preparations) or cosmetic preparations (in particular those for application in the in the region of the head) in quantities of 0.9-99.999999% by weight, preferably 10-80% by weight, based on the total weight of the preparations. In particular a preparation according to the invention can contain water in a quantity of up to 99.999999% by weight, preferably 5-80% by weight, based on the total weight of the preparation.

The manufacture according to the invention of aroma compositions or preparations according to the invention comprises the steps (1) Providing the following components:
   (a)—deoxy hesperetin dihydrochalcone (I)
      or
      a salt of the deoxy hesperetin dihydrochalcone (I) or a mixture comprising or consisting of a plurality of salts of the deoxy hesperetin dihydrochalcone (I)
      or
      a mixture comprising or consisting of
         deoxy hesperetin dihydrochalcone (I) and
         a salt or a plurality of salts of the deoxy hesperetin dihydrochalcone (I),
   and
   (b) one or more further sweet-tasting substances
   and/or
   (c) one or more unpleasant-tasting substances
   and/or
   (d) one or more both sweet- and unpleasant-tasting substances;
   and further components of the aroma composition or preparation,
   wherein components (b)-(d) and the further components contain neither deoxy hesperetin dihydrochalcone (I) nor a salt of the deoxy hesperetin dihydrochalcones (I), and
(2) mixing of components (a) and (b) and/or (c) and/or (d) with the further components.

The preparations according to the invention comprising deoxy hesperetin dihydrochalcone (I) and/or its salts, are preferably manufactured in that deoxy hesperetin dihydrochalcone (I) and/or the salts(s) of the deoxy hesperetin dihydrochalcone (I) is or are incorporated with a solid or liquid excipient in the form of a solution or a mixture in a corresponding preparation, i.e. in particular serving for nutrition, as a food supplement, for oral care or pleasure or as a cosmetic, or a pharmaceutical (base) preparation intended for oral application. As a solution these preparations according to the invention can advantageously also be converted by spray drying into a solid preparation.

According to a further preferred embodiment, for manufacturing preparations according to the invention deoxy hesperetin dihydrochalcone (I) according to the invention and/or its salts and if necessary further ingredients of the preparation according to the invention can first (i.e. prior to incorporation in the preparation) be incorporated in emulsions, in liposomes, e.g. starting from phosphatidylcholine, in microspheres, in nanospheres or also in capsules, granules or extrudates in a matrix suitable for foodstuffs and semi-luxury foods, e.g. starch, starch derivatives, cellulose or cellulose derivatives (e.g. hydroxypropylcellulose), other polysaccharides (e.g. alginate), natural fats, natural waxes (e.g. beeswax, carnauba wax) or proteins, e.g. gelatin.

In a further preferred manufacturing method deoxy hesperetin dihydrochalcone (I) and/or its salts are first complexed with a plurality of suitable complexing agents, for example with cyclodextrins or cyclodextrin derivatives, preferably α- or β-cyclodextrin, and used in this complexed form.

Particular preference is for a preparation according to the invention in which the matrix is selected such that the deoxy hesperetin dihydrochalcone (I) and/or the salt(s) of the deoxy hesperetin dihydrochalcone (I) have a delayed release from the matrix so that a long-lasting effect is achieved.

As further ingredients for preparations according to the invention for nutrition or enjoyment basic substances, auxiliary substances and additives conventional for foodstuffs or semi-luxury foods can be contained in a preparation according to the invention (as described above) or used for the manufacture of such preparations, for example water, mixtures of fresh or processed, vegetable or animal base or raw substances (e.g. raw, roast, dried, fermented, smoked and/or boiled meat, bone, cartilage, fish, vegetables, fruits, herbs, nuts, vegetable or fruit juices or pastes or mixtures thereof), digestible or non-digestible carbohydrates (e.g. sucrose, maltose, fructose, glucose, dextrins, amylose, amylopectin, inulin, xylans, cellulose, tagatose), sugar alcohols (e.g. sorbitol, erythritol), natural or hardened fats (e.g. tallow, lard, palm oil, coconut fat, hardened vegetable fat), oils (e.g. sunflower oil, groundnut oil, maize oil, olive oil, fish oil, soybean oil, sesame oil), fatty acids or their salts (e.g. potassium stearate), proteinogenic or non-proteinogenic amino acids and related compounds (e.g. γ-minobutyric acid, taurine), peptides (e.g. glutathione), natural or processed proteins (e.g. gelatin), enzymes (e.g. peptidases), nucleic acids, nucleotides, other taste-correcting agents or taste modulators for unpleasant taste impressions or not unpleasant taste impressions, in particular taste-modulating substances (e.g. inositol phosphate, nucleotides such as guanosine monophosphate, adenosine monophosphate or other substances such as sodium glutamate or 2-phenoxypropionic acid), emulsifiers (e.g. lecithins, diacylglycerols, gum arabic), stabilizers (e.g. carrageenan, alginate), preservatives (e.g. benzoic acid, sorbic acid), antioxidants (e.g. tocopherol, ascorbic acid), chelators (e.g. citric acid), organic or inorganic acidifying agents (e.g. malic acid, acetic acid, citric acid, tartaric acid, phosphoric acid), (if necessary further) bitter substances (e.g. quinine, caffeine, limonine, amarogentin, humulones, lupolones, catechols, tannins), (if necessary further) sweeteners (e.g. saccharin, cyclamate, aspartame, neotame), mineral salts (e.g. sodium chloride, potassium chloride, magnesium chloride, sodium phosphates), substances that prevent enzymatic browning (e.g. sulfite, ascorbic acid), essential oils, plant extracts, natural or synthetic colorings or coloring pigments (e.g. carotinoids, flavonoids, anthocyanins, chlorophyll and derivatives thereof), spices, substances having trigeminal action or plant extracts containing such substances having trigeminal action, synthetic, natural or nature identical flavorings or fragrances and also odor-correcting agents.

Tooth care agents (as the basis for preparations according to the invention for oral care) generally comprise an abrasive system (abrasive or polishing agent), such as, for example, silicas, calcium carbonates, calcium phosphates, aluminum oxides and/or hydroxyl apatites, surface-active substances, such as, for example, sodium lauryl sulfate, sodium lauryl sarcosinate and/or cocamidopropylbetain, humectants, such as, for example, glycerol and/or sorbitol, thickeners, such as, for example, carboxymethylcellulose, polyethylene glycols, carrageenan and/or Laponite®, (if necessary further) sweeteners, such as, for example, saccharin, taste-correcting agents for unpleasant further taste impressions, or generally not unpleasant taste impressions, taste-modulating substances (e.g. inositol phosphate, nucleotides such as guanosine monophosphate, adenosine monophosphate or other substances such as sodium glutamate or 2-phenoxypropionic acid), cooling active ingredients, such as, for example, menthol, menthol derivatives (e.g. L-menthol, L-menthyl lactate, L-menthyl alkylcarbonates, menthone ketals, menthanecarboxylic acid amides), 2,2,2-trialkylacetic acid amides (e.g. 2,2-diisopropylpropionic acid methylamide), icilin derivatives, stabilizers and active ingredients, such as, for example, sodium fluoride, sodium monofluoro-phosphate, tin difluoride, quaternary ammonium fluorides, zinc citrate, zinc sulfate, tin pyrophosphate, tin dichloride, mixtures of various pyrophosphates, triclosan, cetylpyridinium chloride, aluminum lactate, potassium citrate, potassium nitrate, potassium chloride, strontium chloride, hydrogen peroxide, flavorings and/or sodium bicarbonate or odor correcting agents.

Chewing gums (as a further example of preparations according to the invention serving for oral care) generally comprise a chewing gum base, that is to say a chewable mass which becomes plastic when chewed, sugars of various types, sugar substitutes, sweeteners, sugar alcohols, taste-correcting agents or taste modulators for further unpleasant or, generally not unpleasant taste impressions, taste-modulating substances (e.g. inositol phosphate, nucleotides such as guanosine monophosphate, adenosine monophosphate or other substances such as sodium glutamate or 2-phenoxypropionic acid), humectants, thickeners, emulsifiers, flavorings and stabilizers or odor-correcting agents.

As ingredients for oral pharmaceutical preparations according to the invention all basic substances, auxiliary substances and additives conventional for pharmaceutical preparations intended for oral use may be used. As active ingredients there can be used in particular also orally formulatable pharmaceutical active ingredients that have an unpleasant taste, in particular bitter-tasting substances, the bitter taste impression of which can be masked or reduced according to the invention. The active ingredients, basic substances, auxiliary substances and additives can be converted into the oral forms of administration in a manner known per se. This is generally effected using inert, nontoxic, pharmaceutically suitable auxiliary substances. These include inter alia carriers (e.g. microcrystalline cellulose), solvents (e.g. liquid polyethylene glycols), emulsifiers (e.g. sodium dodecylsulfate), dispersing agents (e.g. polyvinylpyrrolidone), synthetic and natural biopolymers (e.g. albumin), stabilizers (e.g. antioxidants such as ascorbic acid), colorings (e.g. inorganic pigments such as iron oxides) and odor-correcting agents as well as taste-correcting agents, in particular those that do not affect the bitter taste.

Preferably preparations according to the invention (as described above) can also contain an aroma composition (not according to the invention), in order to (further) complete and refine the taste and/or odor of the preparation. Suitable aroma compositions contain, for example, synthetic, natural or nature identical flavorings, fragrances and taste-imparting substances as well as suitable auxiliary substances and carriers. It is considered to be particularly advantageous that a bitter or metallic taste impression coming from aromas, fragrances or flavorings contained in the preparations according to the invention can be masked or reduced, so that the overall flavor or taste profile can be improved.

Preparations according to the invention in the form of semi-finished products can be used to mark or reduce an unpleasant taste impression of finished product preparations manufactured using the semi-finished preparation.

In a particularly preferred embodiment of this invention the deoxy hesperetin dihydrochalcone (I) to be used according to the invention or its salts is or are used in an aroma composition according to the invention or a preparation according to the invention containing an aroma composition according to the invention (as described above) in combination with at least one further substance for modifying, masking or reducing an unpleasant taste impression and/or for intensifying a pleasant taste impression, wherein the pleasant taste impression is preferably a sweet and/or umami taste. In this way a particularly effective masking effect can be achieved.

Further substances to mask or reduce an unpleasant taste impression and/or to intensify a pleasant taste impression or taste correcting agents are—without limiting this invention to these—preferably selected from the group consisting of nucleotides (for example adenosine-5'-monophosphate, cytidine-5'-monophosphate) or the pharmaceutically acceptable salts thereof, lactisoles, sodium salts (for example sodium chloride, sodium lactate, sodium citrate, sodium acetate, sodium gluconoate), hydroxyflavanones, for example eriodictyol, sterubin (eriodictyol-7-methylether), homoeriodictyol, and the sodium, potassium, calcium, magnesium or zinc salts thereof (in particular those as described in EP 1 258 200, which is part of this application by way of reference with respect to the corresponding compounds disclosed therein), hydroxybenzoic acid amides, for example 2,4-dihydroxybenzoic acid vanillylamide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide-mono-sodium salt, 2,4-dihydroxybenzoic acid-N-2-(4-hydroxy-3-methoxyphenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl) ethyl]amide; 4-hydroxybenzoic acid vanillylamide (in particular those as described in WO 2006/024587, which is part of this application by way of reference with respect to the corresponding compounds disclosed therein); hydroxydeoxybenzoins, for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone) (in particular those as described in WO 2006/106023 which is part of this application by way of reference with respect to the corresponding compounds disclosed therein); hydroxyphenyl alkane diones, for example gingerdione-[2], gingerdione-[3], gingerdione-[4], dehydrogingerdione-[2], dehydrogingerdione-[3], dehydrogingerdione-[4]) (in particular those as described in WO 2007/003527 which is part of this application by way of reference with respect to the corresponding compounds disclosed therein); diacetyl trimers (in particular those as described in WO 2006/058893 which is part of this application by way of reference with respect to the corresponding compounds disclosed therein); gamma-aminobutyric acids (in particular those as described in WO 2005/096841 which is part of this application by way of reference with respect to the corresponding compounds disclosed therein); divanillins (in particular those as described in WO 2004/078302 which is part of this application by way of reference with respect to the corresponding compounds disclosed therein) and 4-hydroxy-dihydrochalcones (preferably as described in US 2008/

0227867 A1, which is part of this application by way of reference with respect to the corresponding compounds disclosed therein), in this respect in particular phloretin and davidigenin, amino acids or mixtures of whey proteins with lecithins, hesperetin as disclosed in WO 2007/014879 which is part of this application by way of reference with respect to the corresponding compounds, 4-hydroxychalcones as disclosed in WO 2007/107596 which is part of this application by way of reference with respect to the corresponding compounds, or propylene phenyl glycosides (chavicolgylcosides) as described in EP 1 955 601 A1 which is part of this application by way of reference with respect to the corresponding compounds, pellitorin and derived flavoring compositions as described in U.S. Provisional Application 60/944,854 and in the patent applications based thereon, umami compounds as described in WO 2008/046895 and EP 1 989 944 A1 which are in each case part of this application by way of reference with respect to the corresponding compounds as well as umami compounds as described in U.S. Provisional Application 60/984,023 or U.S. Provisional Application 61/061,273 and in the patent applications based thereon, which are part of this application by way of reference with respect to the corresponding compounds disclosed therein.

Combinations with homoeriodictyol and the sodium, potassium, calcium, magnesium or zinc salts thereof, divanillins, phloretin and/or hesperitin are particularly preferred.

A further aspect of this invention concerns a method for influencing the strength of a taste impression of sweet-tasting, unpleasant-, in particular bitter-, tasting or both sweet- and unpleasant-, in particular bitter-, tasting substances, with the following step:

Mixing of the following components
(a)—deoxy hesperetin dihydrochalcone (I)
or
a salt of the deoxy hesperetin dihydrochalcone (I) or a mixture comprising or consisting of a plurality of salts of the deoxy hesperetin dihydrochalcone (I),
or
a mixture comprising or consisting of
deoxy hesperetin dihydrochalcone (I) and
a salt or a plurality of salts of the deoxy hesperetin dihydrochalcone (I),
and
(b) one or more further sweet-tasting substances
and/or
(c) one or more unpleasant-, in particular bitter-, tasting substances
and/or
(d) one or more both sweet- and unpleasant-, in particular bitter-, tasting substances;
and if necessary further components
wherein components (b)-(d) and the further components neither are nor contain deoxy hesperetin dihydrochalcone (I) nor a salt of the deoxy hesperetin dihydrochalcone (I),
wherein the total quantity of component (a) in the mixture is sufficient to influence the strength of the taste impression of the sweet-tasting substance(s) (b), of the unpleasant-, in particular bitter-, tasting substance(s) (c) or the both sweet- and unpleasant-, in particular bitter-, tasting substance(s) (d).

Preference is for a variant of the method according to the invention, wherein the total quantity of components (a) in the mixture is sufficient,
to synergistically intensify the sweet taste impression of a sweet-tasting substance or mixture of substances (b),
and/or
to reduce or to mask the unpleasant taste impression of an unpleasant-tasting substance or mixture of substances (c), in particular the bitter taste impression of a bitter-tasting substance or mixture of substances (c)
and/or
to synergistically intensify the sweet taste impression of a both sweet- and unpleasant-, in particular bitter-tasting substance or mixture of substances (d) and to reduce or modify the unpleasant, in particular bitter, taste impression of the both sweet- and unpleasant-, in particular bitter-, tasting substance or mixture of substances (d).

This last variant of the method is particularly preferred.

For further preferred embodiments of a method according to the invention, especially concerning deoxy hesperetin dihydrochalcone (I) and its salts and the preferred choice of substances (b), (c) or (d) that stated above applies accordingly.

The invention will be further described in the following on the basis of examples. The examples serve to illustrate the invention, without thereby restricting the scope of protection of the claims. All numerical information relates to weight, unless stated otherwise.

EXAMPLES

Example 1

1-(2,4-dihydroxy-phenyl)-3-(3-hydroxy-4-methoxy-phenyl)-propan-1-one (compound (I))

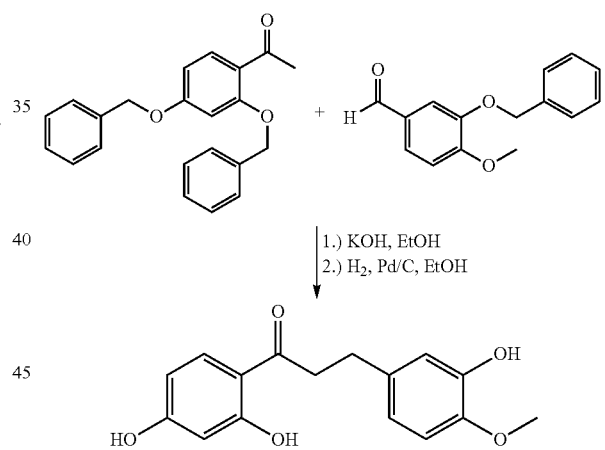

A solution of 11.28 g (33.9 mmol) 1-(2,4-bis-benzyloxy-phenyl)-ethanone (see *Chemical & Pharmaceutical Bulletin* 1996, 44(5), 972-979) and 7.27 g (33.9 mmol) 3-benzyloxy-4-methoxy-benzaldehyde (*Tetrahedron* 1992, 48(36), 7527-7538) in 170 ml ethanol is placed in a three-necked flask with intensive cooling. Then 2.54 g (6.8 mmol) of a 15% ethanolic potassium hydroxide solution is added within 5 minutes and the mixture is heated for three hours with reflux. Following cooling of the reaction mixture to 5° C. the resultant solid is drawn off, washed five times with 100 ml ethanol/water (6:4) each time and dried in the vacuum cabinet at 80° C. 11.88 g of a colorless solid are obtained. Then 9.20 g (15.5 mmol) of this solid are dissolved in 200 ml ethyl acetate and 50 ml isopropanol and 2.0 g palladium (5% immobilized on activated carbon). This mixture is hydrated for 90 minutes at 60° C. under normal pressure. Following cooling the catalyst is separated off by filtration through diatomaceous earth. Following removal of the solvent recrystallization from hexane/ ethyl acetate (15:6) is performed. 3.21 g (11.1 mmol) of the corresponding product are obtained as a colorless solid.

$^1$H-NMR (400 MHz, CD$_3$OD): 2.87 (m, 2H); 3.16 (m, 2H); 3.80 (s, 3H); 4.87 (bs, 3H); 6.25 (d, J=2.4 Hz, 1H); 6.33 (dd, J=2.4 Hz, J=8.9 Hz, 1H); 6.65 (dd, J=2.2 Hz, J=8.1 Hz, 1H); 6.71 (d, J=2.1 Hz, 1H); 6.80 (d, J=8.1 Hz, 1H); 7.68 (d, J=8.9 Hz, 1H) ppm.

$^{13}$C-NMR (100 MHz, CD$_3$OD): 31.1 (CH$_2$); 40.7 (CH$_2$); 56.5 (CH$_3$); 103.6 (CH); 109.1 (CH); 112.9 (CH); 114.4 (C); 116.5 (CH); 120.5 (CH); 133.7 (CH); 135.4 (C); 147.41 (C); 147.44 (C); 166.3 (C); 166.4 (C); 205.5 (C=O) ppm.

Mass spectrum (EI): m/z (%)=289 (6); 288 (M$^{•+}$, 35); 151 (12); 150 (15); 138 (8); 137 (100); 119 (8); 91 (7); 81 (10); 53 (6).

Application Example 1

Bitter-reduction of a Bitter Substance Solution

In order to quantify the decrease (i.e. the masking or reduction) in bitter impression in a specimen, the bitterness of a 500 ppm caffeinated solution was compared by a group of experts in each case with a specimen containing 500 ppm caffeine and also various concentrations of deoxy hesperetin dihydrochalcone (I) (rating: 1 [not bitter] to 10 [extremely bitter]).

For the assessment, i.e. calculation of the reduction (in %) of the bitter impression in each case the average values of the assessments of the group of experts for the caffeinated solution and the specimen to be compared containing caffeine and a substance to be assessed were used. 2,4-dihydroxybenzoic acid (2,4-DHB) was used here for comparison (reference) in accordance with U.S. Pat. No. 5,643,941.

| (Test/comparison) substance | Caffeine (Bitter substance) | Bitter impression (1-10) | | Reduction in bitter impression |
|---|---|---|---|---|
| | | Caffeinated solution | Specimen (Caffeine + substance) | |
| 100 ppm 2,4-DHB | 500 ppm | 5.1 ± 1.0 | 5.0 ± 1.0 | 3% |
| 10 ppm deoxy hesperetin dihydrochalcone (I) | 500 ppm | 4.9 ± 1.5 | 4.8 ± 1.6 | 2% |
| 25 ppm deoxy hesperetin dihydrochalcone (I) | 500 ppm | 5.2 ± 1.6 | 3.8 ± 1.5 | 26% (p < 0.07) |
| 50 ppm deoxy hesperetin dihydrochalcone (I) | 500 ppm | 4.1 ± 2.1 | 3.7 ± 1.6 | 11% |
| 100 ppm deoxy hesperetin dihydrochalcone (I) | 500 ppm | 5.1 ± 1.8 | 4.9 ± 1.9 | 3% |

Application Example 2

Bitter Reduction of Various Bitter Substance Solutions

In order to quantify the decrease (i.e. the masking or reduction) in the bitter impression in a specimen, the bitterness of a solution containing either 100 ppm naringin or 250 ppm salicin or 500 ppm epigallocatechin gallate and 75 ppm ascorbic acid was compared by a group of experts in each case with a specimen containing either 100 ppm naringin or 250 ppm salicin or 500 ppm epigallocatechin gallate and 75 ppm ascorbic acid and additionally 50 ppm deoxy hesperetin dihydrochalcone (I) (rating: 1 [not bitter] to 10 [extremely bitter]).

For the assessment, i.e. calculation of the reduction (in %) of the bitter impression in each case the average values of the assessments of the group of experts for the respective bitter substance solution and the bitter substance solution also containing 50 ppm deoxy hesperetin dihydrochalcone (I) were used.

| Bitter substance | Bitter impression (1-10) | | Reduction in bitter impression |
|---|---|---|---|
| | Bitter substance | Bitter substance + (I) | |
| 100 ppm naringin | 6.9 ± 2.4 | 6.4 ± 2.4 | 7% |
| 250 ppm salicin | 7.6 ± 1.6 | 6.5 ± 2.2 | 15% |
| 500 ppm epigallocatechin gallate + 75 ppm ascorbic acid | 6.8 ± 2.6 | 6.1 ± 2.9 | 10% |

Application Example 3

Intensification of the Sweet Impression of a Sugar Solution

Comparative Test 1:

In order to quantify the intensification of the sweet impression, in each case the sweetness of a 5% sucrose solution was compared by a group of experts with a specimen containing 5% sucrose and 10 ppm, 25 ppm, 50 ppm or 75 ppm of the deoxy hesperetin dihydrochalcone (I) to be used according to the invention (rating: 1 [not sweet] to 10 [extremely sweet]).

For the assessment, i.e. calculation of the intensification (in %) of the sweet impression in each case the average values of the assessments of the group of experts for the sucrose solution and the specimen for comparison containing sucrose and deoxy hesperetin dihydrochalcone (I) were used.

| (Test/comparative) substance | Sucrose (sweetener) | Sweet impression (1-10) | | Intensification of the sweet impression |
|---|---|---|---|---|
| | | Sucrose solution | Specimen (Sucrose + (I)) | |
| 10 ppm deoxy hesperetin dihydrochalcone (I) | 5% | 5.3 ± 1.5 | 6.4 ± 1.6 | 21% (p < 0.05) |
| 25 ppm deoxy hesperetin dihydrochalcone (I) | 5% | 4.9 ± 1.5 | 6.9 ± 1.9 | 42% (p < 0.003) |
| 50 ppm deoxy hesperetin dihydrochalcone (I) | 5% | 5.5 ± 1.0 | 8.2 ± 0.9 | 48% (p < 2·10$^{-8}$) |
| 75 ppm deoxy hesperetin dihydrochalcone (I) | 5% | 5.9 ± 1.8 | 7.1 ± 1.7 | 21% (p < 0.08) |

Comparative Test 2:

In order to assess the synergistic sweetness intensifying effect of deoxy hesperetin dihydrochalcone (I) the following comparative test was carried out:

The inherent sweetness of deoxy hesperetin dihydrochalcone (I), which was dissolved in pure form in water in various concentrations (0.0025 or 0.0050% by weight in water), was determined using a comparative range of different sucrose concentrations in water (0; 0.25; 0.5; 0.75; 1.0; 1.5; 2.0; 3.0; 4.0 and 5.0% by weight sucrose in water) by a group of experts (panelists).

The panelists were asked to test each solution of the compound (I) in water against the sucrose series and to rate it according is degree of sweetness (sucrose equivalence). From the results produced by the panelists it was possible to determine the inherent sweetness of the deoxy hesperetin dihydrochalcone (I) for the above-mentioned concentrations. Apart from the sucrose equivalence of the solutions of the compound (I) in water (i.e. without sucrose) the sucrose equivalence in a 5% sucrose solution was also determined with a corresponding quantity of compound (I).

| Concentration of deoxy hesperetin dihydrochalcone (I) in water [% by weight] | Determination of the sucrose equivalence in water (without sucrose) | Sucrose equivalence in a 5% sucrose solution with (I) | |
|---|---|---|---|
| | | Calculation (5 + x) % | Determination |
| 0.0010 | 0.13% | 5.13% | 6.4% |
| 0.0025 | 0.33% | 5.33% | 6.9% |
| 0.0050 | 0.58% | 5.58% | 8.2% |
| 0.0075 | 0.58% | 5.58% | 7.1% |
| 0.0100 | 0.79% | 5.79% | — |

In all the cases tested a synergistic intensification in sweetness was found when an in itself not sweet concentration of deoxy hesperetin dihydrochalcone (I) was added. So it could in theory be expected that a 5% sucrose solution (i.e. a sucrose solution which sensorially by definition corresponds to 5% sucrose equivalents), containing 10 ppm, 25 ppm, 50 ppm or 75 ppm deoxy hesperetin dihydrochalcone (I), through a purely additive effect of the inherent sweetness of deoxy hesperetin dihydrochalcone (I) (see the sucrose equivalence determined in water) results in a sweetness of approximately 5.13%, 5.33%, 5.58% and again 5.58% sucrose equivalents. The sensorial assessment of such a 5% sucrose solution with 10 ppm, 25 ppm, 50 ppm or 75 ppm deoxy hesperetin dihydrochalcone (I) by the panelists however on average resulted in a sucrose equivalence of 6.4%, 6.9%, 8.2% or 7.1%. This corresponds in view of the purely theoretically expected values to a synergy or a synergistic additional effect of approximately 25%, 29%, 47% or 27%. It is noticeable that at the maximum tested concentration of 75 ppm—as might be expected—neither the maximum absolute nor the maximum synergistic intensification was measured.

Application Example 4

Comparison of the Intensification of the Sweet Impression of a Sugar Solution of Various Deoxy Dihydrochalcones In order to quantify the intensification of the sweetness impression, in each case the sweetness of a 5% sucrose solution was compared by a group of experts with a specimen containing 5% sucrose and 30 ppm or 50 ppm of a deoxy dihydrochalcone ((rating: 1 [not sweet] to 10 [extremely sweet])).

For the assessment, i.e. calculation of the intensification (in %) of the sweet impression in each case the average values of the assessments of the group of experts for the sucrose solution and the specimen containing sucrose and deoxy dihydrochalcone for comparison were used.

| (Test/comparative substance) | Sucrose (sweetener) | Sweet impression (1-10) | | Intensification of the sweet effect |
|---|---|---|---|---|
| | | Sucrose solution | Specimen (sucrose + substance) | |
| 50 ppm deoxy hesperetin dihydrochalcone (I) | 5% | 5.5 ± 1.0 | 8.2 ± 0.9 | 48% (p < 2 · 10$^{-8}$) |
| 30 ppm davidigenin (1) | 5% | 5.6 ± 1.5 | 5.7 ± 1.4 | 2% (p < 0.8) |
| 50 ppm 2',4,4'-trihydroxy-3-methoxy dihydrochalcone (2) | 5% | 5.2 ± 1.2 | 5.6 ± 1.4 | 8% (p < 0.35) |
| 50 ppm 6-methyl-davidigenin (3) | 5% | 5.4 ± 1.6 | 6.1 ± 1.8 | 12% (p < 0.31) |

Application Example 5

Spray-dried Preparation as a Semi-Finished Product for Flavoring of Finished Products

| Ingredient | Use in % by weight Preparation | | | | |
|---|---|---|---|---|---|
| | A | B | C | D | E |
| Drinking water | 60.8 | 60.8 | 60.8 | 60.8 | 60.8 |
| Maltodextrin from wheat | 24.3 | 24.3 | 24.3 | 24.3 | 24.3 |
| Gum Arabic | 6.1 | 6.1 | 6.1 | 6.1 | 6.1 |
| Deoxy hesperetin dihydrochalcone | 8.8 | 6.6 | 5.5 | 3.3 | 4.4 |
| Hesperetin | — | 2.2 | — | — | 1.1 |
| Homoeriodictyol-sodium salt | — | — | — | 5.5 | 3.3 |
| Phloretin | — | — | 3.3 | — | — |

The drinking water is placed in a container and maltodextrin and gum Arabic is dissolved in it. Then the flavoring is emulsified in the carrier solution with a Turrax. The temperature of the spray solution should not exceed 30° C. The mixture is then spray-dried (inlet nominal temperature: 185-195° C., outlet nominal temperature: 70-75° C.).

Application Example 6

Combination with Sweeteners 90 g sucrose and 10 g tagatose are added to 0.5 g of a spray-dried semi-finished product from application example 5 (according to preparation A) and mixed. The product can for example be used as a sweetener with a bitter masking effect for coffee or tea.

Application Example 7

Low-sugar Soft Drink

| Ingredient | Use in % by weight Preparation | | | | | | |
|---|---|---|---|---|---|---|---|
| | A | B | C | D | E | F | G |
| Sugar | 10 | 8 | 7 | 8 | 7 | 7 | 7 |
| Citric acid | 0.15 | 0.15 | 0.15 | 0.15 | 0.15 | 0.15 | 0.15 |
| Lemon flavor | 0.1 | 0.1 | 0.1 | 0.1 | 0.1 | 0.1 | 0.1 |
| Deoxy hesperetin dihydrochalcone (I) | — | — | — | 0.005 | 0.005 | 0.005 | 0.005 |
| Phloretin | — | — | — | — | — | 0.002 | — |
| Hesperetin | — | — | — | — | — | — | 0.001 |
| Water | | | | to 100 | | | |

Preparation A: Comparative preparation with 10% sugar
Preparation B: Comparative preparation with 8% sugar
Preparation C: Comparative preparation with 7% sugar
Preparation D-G: Preparations according to the invention with reduced sugar compared with A (and for preparations E-G compared with B) with 7-8% sugar The additives were mixed in the sequence shown and made up with water to 100% by weight. The mixtures are filled into glass bottles and carbonated.

The preparations were then tested and compared with each other in blind duo tests. Here the sweetness was estimated by experts using a rating of from 1 [not sweet] to 10 [extremely sweet].

| Comparison ($1^{st}$ and $2^{nd}$ specimen) | Sweet impression (1-10) | | Difference (sweet impression) | Significance p |
|---|---|---|---|---|
| | $1^{st}$ specimen | $2^{nd}$ specimen | | |
| Preparations A and B | 7.1 ± 1.4 | 4.6 ± 1.3 | −35% | <0.001 |
| Preparations A and D | 7.0 ± 1.4 | 5.6 ± 1.7 | −20% | <0.03 |
| Preparations A and C | 7.1 ± 1.8 | 4.5 ± 1.4 | −37% | <0.001 |
| Preparations A and E | 6.9 ± 1.5 | 5.3 ± 1.5 | −23% | <0.004 |
| Preparations A and F | 6.9 ± 1.5 | 6.0 ± 1.6 | −12% | <0.1 |
| Preparations A and G | 6.7 ± 1.0 | 5.4 ± 1.6 | −20% | <0.005 |

Accordingly, by reducing the amount of sugar (by 2 or 3% by weight in preparation B or C, based on the total weight of the preparation) a decrease in the sweetness of approximately 35 or 37% (see table) was observed.

By adding a small quantity of the deoxy hesperetin dihydrochalcone (I) to be used according to the invention alone (see preparations D and E) or in combination with known flavorings for intensifying sweetness (see preparations F and G) on the basis of the synergistic sweetness intensifying effect of deoxy hesperetin dihydrochalcone (I) it was possible to significantly lower the difference between the full sugar preparation and that with low sugar.

Application Example 8

Tea Preparation

| Ingredient | Use in % by weight Preparation | | |
|---|---|---|---|
| | A | B | C |
| Black leaf tea, Ceylon | 94.0 | | |
| Green leaf tea, China | | 92.0 | |
| Mate leaf tea, Peru | | | 95.0 |
| Semi-finished product A from application example 5 | 6.0 | | |
| Semi-finished product D from application example 5 | | 8.0 | |
| Semi-finished product E from application example 5 | | | 5.0 |

The tea and the semi-finished product are mixed and packed into tea bags made from filter paper. For the application a teabag is infused in 100-250 ml boiling water and left to draw for 2-5 minutes.

Application Example 9

Use in a Soya Drink

| Ingredient | Use in % by weight Preparation | | | |
|---|---|---|---|---|
| | A | B | C | D |
| Soya milk (local supermarket, unflavored, unsweetened) | 96.7 | 99.68 | 98.29 | 97.60 |
| Vanilla flavor | 0.1 | 0.1 | | 0.05 |
| Milk flavor | | | 0.1 | 0.05 |
| Saccharose | 3.0 | | 1.5 | 2.0 |
| Rebaudioside A 95% | | 0.02 | 0.01 | |
| Emulgum | 0.1 | 0.1 | | 0.1 |
| 10% deoxy hesperetin dihydrochalcone (I) in ethanol | 0.1 | 0.1 | 0.1 | 0.1 |
| Hesperetin, 5% in Ethanol | | | | 0.1 |

Deoxy hesperetin dihydrochalcone (I) was pre-dissolved in ethanol and added to a Soya milk from a local supermarket. The mixture was stirred with a milk flavoring in a glass beaker.

Application Example 10

Use in a Chewing Gum

| Part | Ingredient | Use in % by weight |
|---|---|---|
| A | Chewing gum base from "Jagum T" company | 30.0 |
| B | Sorbitol, powdered | 39.0 |
| | Isomalt ® (Palatinit GmbH) | 9.5 |
| | Xylitol | 2.0 |

-continued

| Part | Ingredient | Use in % by weight |
|---|---|---|
| | Mannitol | 3.0 |
| | Rebaudioside A 98% | 0.2 |
| | Emulgum ® (Colloides Naturels, Inc.) | 0.3 |
| C | Sorbitol, 70% | 14.0 |
| | Glycerin | 1.0 |
| D | Flavoring, containing 1% by weight deoxy hesperetin dihydrochalcone (I) based on the total weight of the flavoring | 1.0 |

Parts A to D are mixed and kneaded intensively. The raw mass can be processed by way of example in the form of thin strips into ready-to-consume chewing gum.

Application Example 11

Use in a Toothpaste

| Part | Ingredient | Use in % by weight |
|---|---|---|
| A | Demineralized water | 22.00 |
| | Sorbitol (70%) | 45.00 |
| | Solbrol ® M, sodium salt (Bayer AG, p-hydroxybenzoic acid alkyl ester) | 0.15 |
| | Trisodium phosphate | 0.10 |
| | Rebaudioside A, 98% | 0.10 |
| | Sodium monofluorophosphate | 1.12 |
| | Polyethylene glycol 1500 | 5.00 |
| B | Sident 9 (abrasive silicon dioxide) | 10.00 |
| | Sident 22 S (thickening silicon dioxide) | 8.00 |
| | Sodium carboxymethylcellulose | 0.90 |
| | Titanium dioxide | 0.50 |
| C | Demineralized water | 4.63 |
| | Sodium lauryl sulfate | 1.50 |
| D | Flavoring containing 1% by weight deoxy hesperetin dihydrochalcone (I), based on the total weight of the flavoring | 1.00 |

The ingredients of Parts A and B are in each case pre-mixed separately and stirred well under a vacuum at 25-30° C. for 30 minutes. Part C is pre-mixed and added to A and B;

D is added and the mixture stirred well under a vacuum at 25-30° C. for 30 minutes. After pressure relief the toothpaste is finished and can be filled.

Application Example 12

Sugar-free Hard Caramels

| | Content (%) | | | |
|---|---|---|---|---|
| Ingredient | A | B | C | D |
| Palatinite, Type M | 75.00 | 74.00 | 75.50 | 75.00 |
| Citric acid | — | 1.00 | 0.50 | — |
| Coloring, yellow | — | 0.01 | — | — |
| Coloring, red | — | — | 0.01 | — |

-continued

| | Content (%) | | | |
|---|---|---|---|---|
| Ingredient | A | B | C | D |
| Coloring, blue | 0.01 | — | — | 0.01 |
| Peppermint flavoring | 0.1 | — | — | 0.1 |
| Lemon flavoring | — | 0.1 | — | — |
| Red fruit flavoring | — | — | 0.1 | — |
| Rebaudioside A 98% | — | 0.040 | — | 0.040 |
| Deoxy hesperetin dihydrochalcone (I) | 0.010 | 0.005 | 0.010 | 0.005 |
| Hesperetin | — | 0.001 | — | 0.001 |
| Phloretin | — | 0.002 | — | — |
| Water | to 100 | | | |

Palatinite was mixed with water and the mixture melted at 165° C. and then cooled to 115° C. The other ingredients were added and after mixing cast into molds, following hardening removed from the molds and then individually packaged.

Application Example 13

Reduced-sugar Custard

| | Preparation (information in % by weight) | | | |
|---|---|---|---|---|
| Ingredients | A | B | C | D |
| Sucrose | 7.8 | 5.4 | 5.4 | 5.4 |
| Starch | 3.0 | 3.0 | 3.0 | 3.0 |
| Skimmed milk powder | 1.5 | 1.5 | 1.5 | 1.5 |
| Aubygel MR50 | 0.5 | 0.5 | 0.5 | 0.5 |
| Vanilla bean extract, spray-dried, Symrise | 0.1 | 0.1 | 0.1 | 0.1 |
| Deoxy hesperetin dihydrochalcone (I) | — | — | 0.01 | 0.005 |
| D-tagatose | — | — | — | 0.1 |
| Milk, 1.5% fat content | to 100 | | | |

A: Comparative preparation with 7.8% sucrose content
B: Comparative preparation with (compared with A) reduced sucrose content
C: Preparation according to the invention with (compared with A) reduced sucrose content and deoxy hesperetin dihydrochalcone (I)
D: Preparation according to the invention with (compared with A) reduced sucrose content, D-tagatose and deoxy hesperetin dihydrochalcone (I)

The solid substances were provided and stirred into the milk. The mixture was heated to 95° C. for 2 minutes, stirring well, filled and cooled to 5-8° C.

For preparation C in a tasting by test subjects the sweetness of the comparative preparation A containing 7.8% sucrose (with a somewhat delayed taste impression) was achieved. Compared with the comparative preparation B, comparative preparation C had a significantly stronger sweetness. D was comparable with C, but had a better initial sweetness.

Application Example 14

Low-Fat Yogurts

| | Preparation (amounts as % by weight) | | |
|---|---|---|---|
| Ingredient | A | B | C |
| Sucrose | 10.0 | 8.0 | 6.0 |
| Tagatose | — | — | 0.5 |
| Fructose | — | — | 0.5 |
| Deoxy hesperetin dihydrochalcone (I) | — | 0.05 | 0.025 |
| Hesperetin | — | — | 0.005 |
| Yogurt, 0.1% fat | to 100 | | |

A: Comparative preparation with 10% Sucrose
B, C: Preparations according to the invention with sweetener mixture and deoxy hesperetin dihydrochalcone (I)

The ingredients were mixed and cooled at 5° C.

Application Example 15

Use Together with Sweeteners in Low-Fat Yogurts

| | Preparation (amounts in % by weight) | | | |
|---|---|---|---|---|
| Ingredient | A | B | c | D |
| D-tagatose | 0.482 | 0.482 | 0.482 | — |
| Sucralose | 0.003 | 0.003 | 0.003 | — |
| Aspartame | 0.005 | 0.005 | 0.005 | — |
| Acesulfame K | 0.01 | 0.01 | 0.01 | — |
| Rebaudioside A 98% | — | — | — | 0.050 |
| Deoxy hesperetin dihydrochalcone (I) | — | 0.05 | 0.025 | 0.025 |
| Hesperetin | — | — | 0.015 | 0.015 |
| Phloretin | — | — | 0.005 | 0.005 |
| Yogurt, 0.1% fat | to 100 | | | |

A: Comparative preparation with sweetener mixture
B-D: Preparations according to the invention with sweetener mixture and deoxy hesperetin dihydrochalcone (I)

The ingredients were mixed and cooled at 5° C.

Application Example 16

Mixed Milk Drinks

| | Preparation (amounts in % by weight) | | | |
|---|---|---|---|---|
| Ingredient | A | B | C | D |
| Sucrose | 10.0 | 8.0 | 8.0 | 7.0 |
| Fructose | — | — | — | 0.5 |
| Deoxy hesperetin dihydrochalcone (I) | — | — | 0.05 | 0.025 |
| Hesperetin | — | — | — | 0.025 |
| Phloretin | — | — | — | 0.005 |
| UHT milk, 1.5% fat | to 100 | | | |

A, B: Comparative preparations with sugar
C, D: Preparations according to the invention with sugar and deoxy hesperetin dihydrochalcone (I)

The ingredients were mixed, made up with milk, stirred thoroughly, poured into bottles and stored cooled at 5° C.

Application Example 17

Reduced-sugar Tomato Ketchup

| | Preparation (amounts in % by weight) | | | | | | | |
|---|---|---|---|---|---|---|---|---|
| Ingredient | A | B | C | D | E | F | G | H |
| Common salt | 2.0 | 2.0 | 2.0 | 2.0 | 2.0 | 2.0 | 2.0 | 2.0 |
| Starch, Farinex WM 55 | 1.0 | 1.0 | 1.0 | 1.0 | 1.0. | 1.0 | 1.0 | 1.0 |
| Sucrose | 12.0 | 9.6 | 9.2 | 8.4 | 9.6 | 9.6 | 8.4 | 8.4 |
| Tomato concentrate × 2 | 40.0 | 40.0 | 40.0 | 40.0 | 30.0 | 30.0 | 30.0 | 30.0 |
| Glucose syrup 80 Brix | 18.0 | 18.0 | 18.0 | 18.0 | 18.0 | 18.0 | 18.0 | 18.0 |
| Spirit vinegar 10% | 7.0 | 7.0 | 7.0 | 7.0 | 3.0 | 3.0 | 3.0 | 3.0 |
| Deoxy hesperetin dihydrochalcone (I) 2.5% in 1,2-propylene glycol | | 0.2 | 0.1 | 0.1 | 0.2 | | 0.1 | 0.1 |
| Hesperetin 2.5% in 1,2-propylene glycol | | | | | | 0.1 | | 0.2 |
| Phloretin 2.5% in 1,2-propylene glycol | | | | 0.2 | 0.2 | | | 0.2 |
| Water | to 100 | | | | | | | |

A: Comparative preparation with sugar

B: Comparative preparation with reduced sugar content (compared to A)

C-H: Preparations according to the invention with reduced sugar content (compared to A) and deoxy hesperetin dihydrochalcone (I)

The ingredients are mixed in the stated sequence and the finished ketchup is homogenized using an agitator, poured into bottles and sterilized.

Application Example 18

Reduced-sugar Ice Cream

| Ingredient | Preparation (content in % by weight) | | | | | |
|---|---|---|---|---|---|---|
| | A | B | C | D | E | F |
| Vegetable fat, melting range 35-40° C. | 20.00 | 20.00 | 20.00 | 20.00 | 20.00 | 20.00 |
| Sugar (saccharose) | 12.00 | 8.00 | 8.00 | 8.00 | 8.00 | 8.00 |
| Skimmed milk powder | 5.00 | 5.00 | 5.00 | 5.00 | 5.00 | 5.00 |
| Glucose syrup 72% dry matter | 5.00 | 5.00 | 5.00 | 5.00 | 5.00 | 5.00 |
| Emulsifier SE 30 (Grindstedt Products, Denmark) | 0.65 | 0.65 | 0.65 | 0.65 | 0.65 | 0.65 |
| Flavoring, containing 0.1% diacetyl and 1% vanillin | 0.20 | 0.20 | 0.20 | 0.20 | 0.20 | 0.20 |
| Deoxy hesperetin dihydrochalcone (I) 2.5% in 1.2-propylene glycol | | | 0.20 | 0.10 | 0.20 | 0.10 |
| Hesperetin 2.5% in 1,2-propylene glycol | | | | 0.10 | | 0.10 |
| Phloretin 2.5% in 1,2-propylene glycol | | | | | 0.05 | 0.05 |
| Skimmed milk | | | | to 100 | | |

A: Comparative preparation with sugar
B: Comparative preparation with reduced sugar content (compared to A)
C-F: Preparations according to the invention with reduced sugar content (compared to A) and deoxy hesperetin dihydrochalcone (I)

The vegetable fat was heated to 58° C. Skimmed milk and glucose syrup were heated to 55° C. and sugar, skimmed milk powder and emulsifier and flavoring were added and the mixture was introduced into the vegetable fat. The mixture was homogenized using a through-flow high-pressure homogenizer (180/50 bar). The resulting mass was tempered for 1 minute at 78° C., then cooled to 2-4° C. and incubated at this temperature for 10 hours for maturing. The matured mass was then filled into containers and stored frozen at −18° C.

Application Example 19

Ice Cream Suitable for Diabetics

An ice cream suitable for diabetics was prepared from the following ingredients and filled into 95 ml portion tubs:

Concentrated, skimmed milk, fructose syrup, strawberry pieces and strawberry puree (15%), vegetable fat, diet chocolate chips (3.5% with soya lecithin emulsifier), whey product, beetroot juice, locust bean gum, guar gum, carrageen, emulsifier (E 471), gelatin, acidifying agent citric acid, strawberry flavoring (containing 1% by weight deoxy hesperetin dihydrochalcone (I), based on the total weight of the strawberry flavoring), carotene coloring.

Nutritional value (per 95 ml):

Protein 1.8 g, carbohydrates 13.3 g (of which fructose 9.5 g), fat 4.2 g.

Application Example 20

Diet Chocolate Based on Maltitol

A chocolate suitable for diabetics was prepared from the following ingredients and poured into rectangular bars:

Maltitol, hazelnut mass, cocoa butter, skimmed milk powder, cocoa mass, inulin, concentrated butter, emulsifier soya lecithins, vanilla flavoring (containing vanilla bean extract), vanillin and 1% by weight deoxy hesperetin dihydrochalcone (I), based on the total weight of the vanilla flavoring.

Nutritional value (per 100 g): protein 8 g, carbohydrates 43 g (of which maltitol 34 g), fat 34 g.und 1% by weight.

Application Example 21

Diet Chocolate Based on Fructose

A chocolate suitable for diabetics was prepared from the following ingredients and poured into rectangular bars:

Cocoa mass, fructose, skimmed milk powder, cocoa butter, inulin, concentrated butter, emulsifier soya lecithin, walnuts, cooking salt, vanilla flavoring (containing vanillin and 1% by weight deoxy hesperetin dihydrochalcone (I), based on the total weight of the vanilla flavoring).

Nutritional value (per 100 g):

Protein 8.8 g, carbohydrates 34 g (of which fructose 23 g, lactose 7.5 g, saccharose 1.4 g), fat 36 g; dietary fiber 18.5 (of which 12.2 g inulin); sodium: 0.10 g. Cocoa content at least 50% by weight.

Application Example 22

Reduced-sugar Muesli Mixture

| No. | Ingredient | A (% by weight), Comparative preparation | B (% by weight), Inventive |
|---|---|---|---|
| 1 | Oat flakes | 17.0 | 18.9 |
| 2 | Crunchy oat flake clusters | 10.0 | 12.0 |
| 3 | Rice Crispies | 16.9 | 17.8 |
| 4 | Cornflakes | 16.5 | 17.5 |
| 5 | Currents | 3.5 | 3.5 |
| 6 | Hazelnuts, chopped | 2.5 | 2.5 |
| 7 | Glucose syrup from wheat, DE 30 | 9.5 | 9.5 |
| 8 | Saccharose | 20.0 | 14.0 |
| 9 | Water | 4.0 | 4.0 |
| 10 | Citric acid powder, anhydrous | 0.1 | 0.1 |
| 11 | Flavoring, containing 2.5% by weight of deoxy hesperetin dihydrochalcone (I), based on the total weight of the flavoring | — | 0.2 |

Ingredients Nos. 1 to 6 are mixed in each case in a rotary drum (Mix 1). Ingredients Nos. 7 to 9 are heated and ingredient No. 10 (in recipe B also ingredient No. 11) is added (Mix 2). Mix 2 is added to Mix 1 and then they are thoroughly mixed together. Finally, the resulting muesli mixture is turned out onto a baking tray and dried in an oven for 8 minutes at 130° C.

Application Example 23

Reduced-sugar Fruit Gums

| Ingredient | A (% by weight), Comparative preparation | B (% by weight), According to the invention |
|---|---|---|
| Water | 23.70 | 25.70 |
| Saccharose | 34.50 | 8.20 |
| Glucose syrup, DE 40 | 31.89 | 30.09 |
| Iso Syrup C* Tru Sweet 01750 (Cerestar GmbH) | 1.50 | 2.10 |
| Gelatin 240 Bloom | 8.20 | 9.40 |
| Polydextrose (Litesse ® Ultra, Danisco Cultor GmbH) | — | 24.40 |
| Yellow and red colorings | 0.01 | 0.01 |
| Citric acid | 0.20 | |
| Cherry flavoring, containing 2.5% by weight of deoxy hesperetin dihydrochalcone (I) based on the flavoring | — | 0.10 |

Note:
polydextrose is itself a non-sweet-tasting polysaccharide with a low calorific value.

Application Example 24

Choco-cappuccino Ice Cream

| Ingredient | A (% by weight), Comparative preparation | B (% by weight) According to the invention |
|---|---|---|
| Glucose-fructose syrup | 14.10 | 14.10 |
| Saccharose | 10.00 | 7.50 |
| Skimmed milk powder | 5.00 | 5.00 |
| Cream (36% fat content) | 24.00 | 24.00 |
| Emulsifier and stabilizer Cremodan ® 709VEG (Danisco) | 0.50 | 0.50 |
| Cocoa powder | 5.975 | 5.975 |
| Carrageenan | 0.025 | 0.025 |
| Cappuccino flavoring | 0.20 | 0.20 |
| Deoxy hesperetin dihydrochalcone (I) 25% in 1,2-propylene glycol/ethanol | — | 0.20 |
| Water | ad 100 | |

Application Example 25

Gelatin Capsules for Direct Consumption

| Ingredient | A (% by weight) | B (% by weight) | C (% by weight) |
|---|---|---|---|
| Gelatin shell: | | | |
| Glycerin | 2.014 | 2.014 | 2.014 |
| Gelatin 240 Bloom | 7.91 | 7.91 | 7.91 |
| Sucralose | 0.065 | 0.065 | 0.065 |
| Allura red | 0.006 | 0.006 | 0.006 |
| Brilliant blue | 0.005 | 0.005 | 0.005 |
| Core composition: | | | |
| Vegetable oil-triglyceride (coconut oil fraction) | 79.55 | 68.70 | 58.95 |
| Orange flavoring containing 1% by weight deoxy hesperetin dihydrochalcone (I), based on the total weight of the flavoring | 10.00 | 20.00 | 28.65 |
| Rebaudioside A 98% | 0.05 | 0.05 | — |
| 2-hydroxypropylmenthylcarbonate | 0.33 | 0.20 | — |
| 2-hydroxyethylmenthylcarbonate | — | 0.20 | 1.00 |
| (1R,3R,4S) menthyl-3-carboxylic-acid-N-ethylamide (WS-3) | — | 0.55 | 0.50 |
| (−)-Menthone glycerin acetal (Frescolat MGA) | — | 0.30 | 0.80 |
| Vanillin | 0.07 | — | 0.10 |

The gelatin capsules suitable for direct consumption were prepared according to WO 2004/050069 and had a diameter of 5 mm and the weight ratio of core material to shell material was 90:10. The capsules opened in the mouth in less than 10 seconds and dissolved completely in less than 50 seconds.

Application Example 26

Carbonated Drink (Flavor Direction: Cola)

| Ingredient | A [% by weight] | B [% by weight] | C [% by weight] | D [% by weight] | E [% by weight] |
|---|---|---|---|---|---|
| Phosphoric acid 85% | 0.635 | 0.635 | 0.635 | 0.635 | 0.635 |
| Citric acid, anhydrous | 0.064 | 0.064 | 0.064 | 0.064 | 0.064 |
| Caffeine | 0.064 | 0.064 | 0.064 | 0.064 | 0.064 |
| Sucrose | 63.60 | — | — | — | 12.9 |
| Sucralose | — | 0.126 | — | — | — |
| Erythritol | — | — | 6.000 | — | — |
| Aspartame | — | — | — | 0.350 | 0.07 |
| Stevioside | — | — | — | 0.300 | — |
| Acesulfame K | — | — | — | — | 0.07 |
| Sugar coloring | 0.800 | 0.800 | 0.800 | 0.800 | 0.800 |
| Cola type drink emulsion | 1.445 | 1.445 | 1.445 | 1.445 | 1.445 |
| Sodium benzoate | 0.106 | 0.106 | 0.106 | 0.106 | 0.106 |
| Deoxy hesperetin dihydrochalcone (I) 25% in 1,2-propylene glycol | | 1.0 | 1.0 | 1.0 | 1.0 |
| Water | to 100 | | | | |

A = drink containing sugar (comparative) drink
B = low-calorie drink
C = low-calorie drink
D = low-calorie drink
E = low-calorie drink The solid components or ingredients are individually mixed with water, combined and made up to 100 g with water. The concentrate obtained is then allowed to age over night at ambient temperature. Finally, 1 part concentrate is mixed with 5 parts carbonated water, filled into bottles and sealed.

Application Example 27

Raspberry Jam (Suitable for Diabetics)

| Ingredient | [g] |
|---|---|
| Fructose, crystalline | 485.0 |
| Pectin | 6.5 |
| Sodium citrate | 1.0 |
| Water | 250.0 |
| Raspberries | 500.0 |
| Calcium lactate (3% solution) | 24 |
| Potassium sorbate (20% solution) | 5 |
| Deoxy hesperetin dihydrochalcone | 0.05 |

30 g fructose are first dried with pectin and the sodium citrate then remixed following the addition of water. The raspberries are then added and the mixture heated to boiling point. Then the remaining 455.0 g of fructose and the calcium lactate are added. The mixture is boiled down to a weight of 1,000 g, cooled slightly with vigorous stirring and calcium sorbate and deoxy hesperetin dihydrochalcone (I) are added. The mass is then filled into jars at a temperature of 80° C.

Application Example 28

Raisin Cookies

| | Ingredients | A [% by weight] | B [% by weight] |
|---|---|---|---|
| A | Margarine | 11.27 | 11.27 |
| | Skimmed milk powder | 1.71 | 1.71 |
| | Sucralose | 0.034 | — |
| | Polydextrose | 19.46 | — |
| | Sucrose | — | 21.494 |
| | Salt | 0.550 | 0.550 |
| B | Whole egg | 9.370 | 9.370 |
| C | Flour | 28.32 | 28.32 |
| | Starch | 6.83 | 6.83 |
| | Sodium hydrogen carbonate | 0.376 | 0.376 |
| | Semi-finished product E from application example 5 | 5.0 | 3.0 |
| D | Raisins | 17.08 | 17.08 |

A = without added sugar
B = containing sugar

The ingredients A are mixed together for 2 minutes. Following addition of the whole egg the mass is beaten for 3 minutes, before the ingredients C are mixed in gradually. Finally the raisins are mixed in. Then the cookies are backed in portions at 220° C. for 10 minutes. After cooling the cookies are placed in airtight packaging.

Application Example 29

Chocolate Cakes

| Ingredients | A [g] | B [g] |
|---|---|---|
| Sucrose | 180.0 | — |
| Lactitol monohydrate | — | 179.5 |

-continued

| Ingredients | A [g] | B [g] |
|---|---|---|
| Butter | 180.0 | 180.0 |
| Whole egg | 180.0 | 180.0 |
| Flour | 150.0 | 150.0 |
| Cocoa powder | 30.0 | 30.0 |
| Saccharin | 0.5 | 0.5 |
| Semi-finished product E from application example 5 | 1.0 | 1.0 |

A = chocolate cakes containing sugar
B = reduced sugar chocolate cakes

Sugar (or pre-mixed lactitol and saccharin) is beaten together with the butter. Then the whole egg is added and likewise mixed in. Then the flour and cocoa powder are mixed in gradually. The mass is then filled into a mold and baked for 60 minutes at 180° C.

The invention claimed is:

1. A composition comprising:
   (I) 1-(2,4-dihydroxy-phenyl)-3-(hydroxyl-4-methoxy-phenyl)-propan-1-one

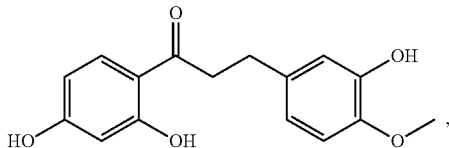 [SMILES: COc1ccc(CCC(=O)c2ccc(O)cc2O)cc1O]

or a salt thereof;
   (II) a sweet-tasting substance that is sucrose; and
   (III) a bitter-tasting substance selected from the group consisting of caffeine, naringin, salicin, epigallocatechin gallate, and ascorbic acid;
      wherein the total amount of 1-(2,4-dihydroxy-phenyl)-3-(hydroxyl-4-methoxy-phenyl)-propan-1-one and/or salt(s) thereof is sufficient to synergistically enhance the sweet taste of the sweet-tasting substance by 10% or more sucrose equivalents, in comparison to an otherwise equivalent preparation without 1-(2,4-dihydroxy-phenyl)-3-(hydroxyl-4-methoxy-phenyl)-propan-1-one and/or salt(s) thereof, and
      wherein the total amount of 1-(2,4-dihydroxy-phenyl)-3-(hydroxyl-4-methoxy-phenyl)-propan-1-one and/or salt(s) thereof is sufficient to reduce and/or mask the unpleasant taste of the bitter tasting substance.

2. A preparation comprising the composition of claim 1, wherein the preparation is a preparation for nourishment, a food supplement preparation, a preparation for oral care, a cosmetic preparation, a pharmaceutical preparation for oral administration, a flavoring mixture, or a semi-finished product.

3. The preparation of claim 2, wherein the preparation is a preparation for nourishment, a food supplement preparation, a preparation for oral care or pleasure, a cosmetic preparation, or a pharmaceutical preparation for oral administration comprising 0.0001% by weight (1 ppm)-0.1% by weight (1000 ppm) of 1-(2,4-dihydroxy-phenyl)-3-(hydroxyl-4-methoxy-phenyl)-propan-1-one, or a salt thereof, based on the total weight of the preparation.

4. The preparation of claim 3 comprising 0.0001% by weight (1 ppm)-0.05% by weight (500 ppm) of 1-(2,4-dihydroxy-phenyl)-3-(hydroxyl-4-methoxy-phenyl)-propan-1-one, or a salt thereof, based on the total weight of the preparation.

5. The preparation of claim 4 comprising 0.001% by weight (10 ppm)-0.025% by weight (250 ppm) of (i) the deoxy hesperetin dihydrochalcone compound of formula (I) and (ii) its salts based on a total weight of the preparation.

6. The preparation of claim 2, wherein the preparation is a flavoring mixture or a semi-finished product comprising 0.0001% by weight-95% by weight of 1-(2,4-dihydroxy-phenyl)-3-(hydroxyl-4-methoxy-phenyl)-propan-1-one, or a salt thereof, based on the total weight of the preparation.

7. The preparation of claim 6, wherein the preparation comprises 0.001% by weight-95% by weight of 1-(2,4-dihydroxy-phenyl)-3-(hydroxyl-4-methoxy-phenyl)-propan-1-one, or a salt thereof, based on the total weight of the preparation.

8. The preparation of claim 7, wherein the preparation comprises 0.01% by weight-50% by weight of 1-(2,4-dihydroxy-phenyl)-3-(hydroxyl-4-methoxy-phenyl)-propan-1-one, or a salt thereof, based on the total weight of the preparation.

9. The preparation of claim 1 comprising a sufficient quantity of 1-(2,4-dihydroxy-phenyl)-3-(hydroxyl-4-methoxy-phenyl)-propan-1-one, or a salt thereof, to increase sweetness by 35% or more sucrose equivalents in comparison to an otherwise equivalent preparation without 1-(2,4-dihydroxy-phenyl)-3-(hydroxyl-4-methoxy-phenyl)-propan-1-one, or a salt thereof.

10. The composition of claim 1, further comprising one or more additional substances to mask and/or reduce an unpleasant taste impression, provided that the substance is not 1-(2,4-dihydroxy-phenyl)-3-(hydroxyl-4-methoxy-phenyl)-propan-1-one, or a salt thereof.

11. The composition of claim 10, wherein the one or more additional substances to mask and/or reduce an unpleasant taste impression is selected from the group consisting of sodium salts, homoeriodictyol or its sodium salts, 2,4-dihydroxybenzoic acid vanillyl amide, gamma-aminobutyric acid, pellitorine and gingerdione.

12. The composition of claim 1, further comprising one or more additional substances to intensify a sweet taste impression, provided the substance is not 1-(2,4-dihydroxy-phenyl)-3-(hydroxyl-4-methoxy-phenyl)-propan-1-one, or a salt thereof.

13. The composition of claim 12, wherein the one or more additional substances to intensify a sweet taste impression is selected from the group consisting of hesperetin, hydroxyphenylalkane diones, deoxybenzoins, 4-hydroxychalcones, propenylphenylglycosides, and divanillins.

14. The composition of claim 1, further comprising one or more additional substances to mask and/ or reduce a metallic, chalky, sour, or astringent taste impression, provided the substance is not 1-(2,4-dihydroxy-phenyl)-3-(hydroxyl-4-methoxy-phenyl)-propan-1-one, or a salt thereof.

15. The composition of claim 1, further comprising one or more additional substances to intensify a salty and/or umami taste impression, provided the substance is not 1-(2,4-dihydroxy-phenyl)-3-(hydroxyl-4-methoxy-phenyl)-propan-1-one, or a salt thereof.

16. A method for manufacturing the composition of claim 1 comprising mixing:
(I) 1-(2,4-dihydroxy-phenyl)-3-(hydroxyl-4-methoxy-phenyl)-propan-1-one

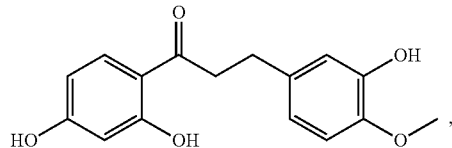 [SMILES: COc1ccc(CCC(=O)c2ccc(O)cc2O)cc1O]

or a salt thereof;
(II) a sweet-tasting substance that is sucrose; and
(III) a bitter-tasting substance selected from the group consisting of caffeine, naringin, salicin, epigallocatechin gallate, and ascorbic acid.

17. A method for synergistically enhancing the sweet taste of a sweet-tasting substance and reducing and/or masking the bitter-taste of a bitter tasting substance comprising mixing:
(I) 1-(2,4-dihydroxy-phenyl)-3-(hydroxyl-4-methoxy-phenyl)-propan-1-one

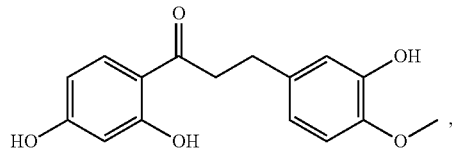 [SMILES: COc1ccc(CCC(=O)c2ccc(O)cc2O)cc1O]

or a salt thereof;
(II) a sweet-tasting substance that is sucrose; and
(III) a bitter-tasting substance selected from the group consisting of caffeine, naringin, salicin, epigallocatechin gallate, and ascorbic acid;
wherein the total amount of 1-(2,4-dihydroxy-phenyl)-3-(hydroxyl-4-methoxy-phenyl)-propan-1-one and/or salt(s) thereof is sufficient to synergistically enhance the sweet taste of the sweet-tasting substance by 10% or more sucrose equivalents, in comparison to an otherwise equivalent preparation without 1-(2,4-dihydroxy-phenyl)-3-(hydroxyl-4-methoxy-phenyl)-propan-1-one and/or salt(s) thereof, and
wherein the total amount of 1-(2,4-dihydroxy-phenyl)-3-(hydroxyl-4-methoxy-phenyl)-propan-1-one and/or salt(s) thereof is sufficient to reduce and/or mask the unpleasant taste of the bitter tasting substance.

* * * * *